(12) United States Patent
Shin et al.

(10) Patent No.: US 10,114,418 B2
(45) Date of Patent: Oct. 30, 2018

(54) ELECTRONIC DEVICE AND OPERATION METHOD THEREOF

(71) Applicant: Samsung Electronics Co., Ltd., Suwon-si, Gyeonggi-do (KR)

(72) Inventors: Jungwoo Shin, Seoul (KR); Joonhwan Kim, Yongin-si (KR); Jeong-Won Ko, Seoul (KR); Munhwi Kim, Seoul (KR); Hye-Jin Kim, Seoul (KR); Kyung-Wook Ro, Seoul (KR); Myoung-Soo Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/710,051

(22) Filed: Sep. 20, 2017

(65) Prior Publication Data

US 2018/0081398 A1    Mar. 22, 2018

(30) Foreign Application Priority Data

Sep. 20, 2016    (KR) .......................... 10-2016-0119915

(51) Int. Cl.
*G06F 1/16*    (2006.01)
*G06F 3/0481*    (2013.01)
*G09G 5/00*    (2006.01)
*H04M 1/02*    (2006.01)

(52) U.S. Cl.
CPC .......... *G06F 1/1641* (2013.01); *G06F 1/1618* (2013.01); *G06F 1/1647* (2013.01); *G06F 1/1652* (2013.01); *G06F 1/1677* (2013.01); *G06F 3/04817* (2013.01); *G09G 5/005* (2013.01); *H04M 1/0268* (2013.01); *G09G 2370/02* (2013.01); *G09G 2370/16* (2013.01)

(58) Field of Classification Search
CPC .. G06F 3/0481; G06F 3/0482; G06F 3/04883; G06F 3/04842
USPC ...... 455/456.3, 566; 345/173, 174; 715/769, 715/800
See application file for complete search history.

(56) References Cited

U.S. PATENT DOCUMENTS

| 2011/0117971 | A1 | 5/2011 | Kim et al. |
| 2015/0011248 | A1 | 1/2015 | Vartanian |
| 2016/0162161 | A1 | 6/2016 | Xue |

FOREIGN PATENT DOCUMENTS

| KR | 10-2016-0023831 A | 3/2016 |
| WO | 2010/028405 A1 | 3/2010 |
| WO | 2015/119474 A1 | 8/2015 |

*Primary Examiner* — Sam Bhattacharya
(74) *Attorney, Agent, or Firm* — Jefferson IP Law, LLP

(57) ABSTRACT

A method and a device for providing a user interface (UI) in an electronic device are provided. The electronic device includes a display that displays a UI corresponding to an operation state of the display, and a processor electrically connected with the display, wherein the processor is configured to determine the operation state of the display, display a first UI based on a first object according to a basic arrangement when the operation state is a first state, display a second UI based on the first object and a second object associated with the first object according to an expanded arrangement when the operation state is a second state, and display the second object in an area adjacent to the first object, corresponding to the expanded arrangement.

20 Claims, 15 Drawing Sheets

ELECTRONIC DEVICE AND OPERATION METHOD THEREOF

CROSS-REFERENCE TO RELATED APPLICATION(S)

This application claims the benefit under 35 U.S.C. § 119(a) of a Korean patent application filed on Sep. 20, 2016 in the Korean Intellectual Property Office and assigned Serial number 10-2016-0119915, the entire disclosure of which is hereby incorporated by reference.

TECHNICAL FIELD

The present disclosure relates to a method and device for providing a user interface (UI) in an electronic device.

BACKGROUND

Recently, with the development of a digital technology, various types of electronic devices, such as a mobile communication terminal, a smart phone, a tablet personal computer (PC), an electronic organizer, a notebook, a personal digital assistant (PDA), and a wearable device, have come to be widely used.

An electronic device is implemented in a form of a multimedia player having multiple functions. For example, an electronic device may provide a call function such as a voice call, a video call or the like, a message transmission/reception function such as a short message service (SMS)/multimedia message service (MMS), an e-mail, or the like, an electronic organizer function, a photographing function, a broadcasting program reproduction function, a video reproduction function, a music reproduction function, an Internet function, a messenger function, a game function, a social network service (SNS) function, or the like.

An electronic device may have a limited size for portability, and the size of a display thereof is thus limited. Accordingly, in recent years, various types of electronic devices have been developed to provide an expanded screen of an electronic device, by means of multiple displays. For example, a plurality of displays are provided to provide an expanded screen by means of multiple displays. Further, with the implementation of multiple displays, there is an increasing need to develop a user interface (UI) corresponding to the multiple displays and the operation thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a device for providing different user interfaces (UIs) in response to a change in the form of a display.

Another aspect of the present disclosure is to provide a method and a device for providing a home screen based on a first object or a home screen based on a first object and a second object, in response to a change in the form between a folded form of the display and an unfolded form of the display.

Another aspect of the present disclosure is to provide a method and a device for providing first objects (e.g., an application icon) and second objects (e.g., a widget) associated with the first objects together in an unfolded state, by increasing a gap between the first objects and displaying the second objects in the increased gap between the first objects, when the state of the display changes from a folded state to the unfolded state.

Another aspect of the present disclosure is to provide a method and a device for providing a UI based on a first object and a second object through the display when the display is unfolded, and may provide a UI based on the first object through one screen of the display and provide a UI based on the second object through the other screen of the display when the display is folded.

In accordance with an aspect of the present disclosure, an electronic device is provided. The electronic device includes a display that displays a UI corresponding to an operation state of the display, and a processor electrically connected with the display, in which the processor is configured to determine the operation state of the display, display a first UI based on a first object according to a basic arrangement when the operation state is a first state, display a second UI based on the first object and a second object associated with the first object according to an expanded arrangement when the operation state is a second state, and display the second object in an area adjacent to the first object, corresponding to the expanded arrangement.

In accordance with another aspect of the present disclosure, an operation method of an electronic device is provided. The method includes determining an operation state of a display, displaying a first UI based on a first object according to a basic arrangement when the operation state is a first state, and displaying a second UI based on the first object and a second object associated with the first object according to an expanded arrangement when the operation state is a second state, in which the second object may be displayed in an area adjacent to the first object, corresponding to the expanded arrangement.

In order to address the technical problem, various embodiments of the present disclosure may include a computer-readable recording medium in which a program for performing the method by a processor is recorded.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
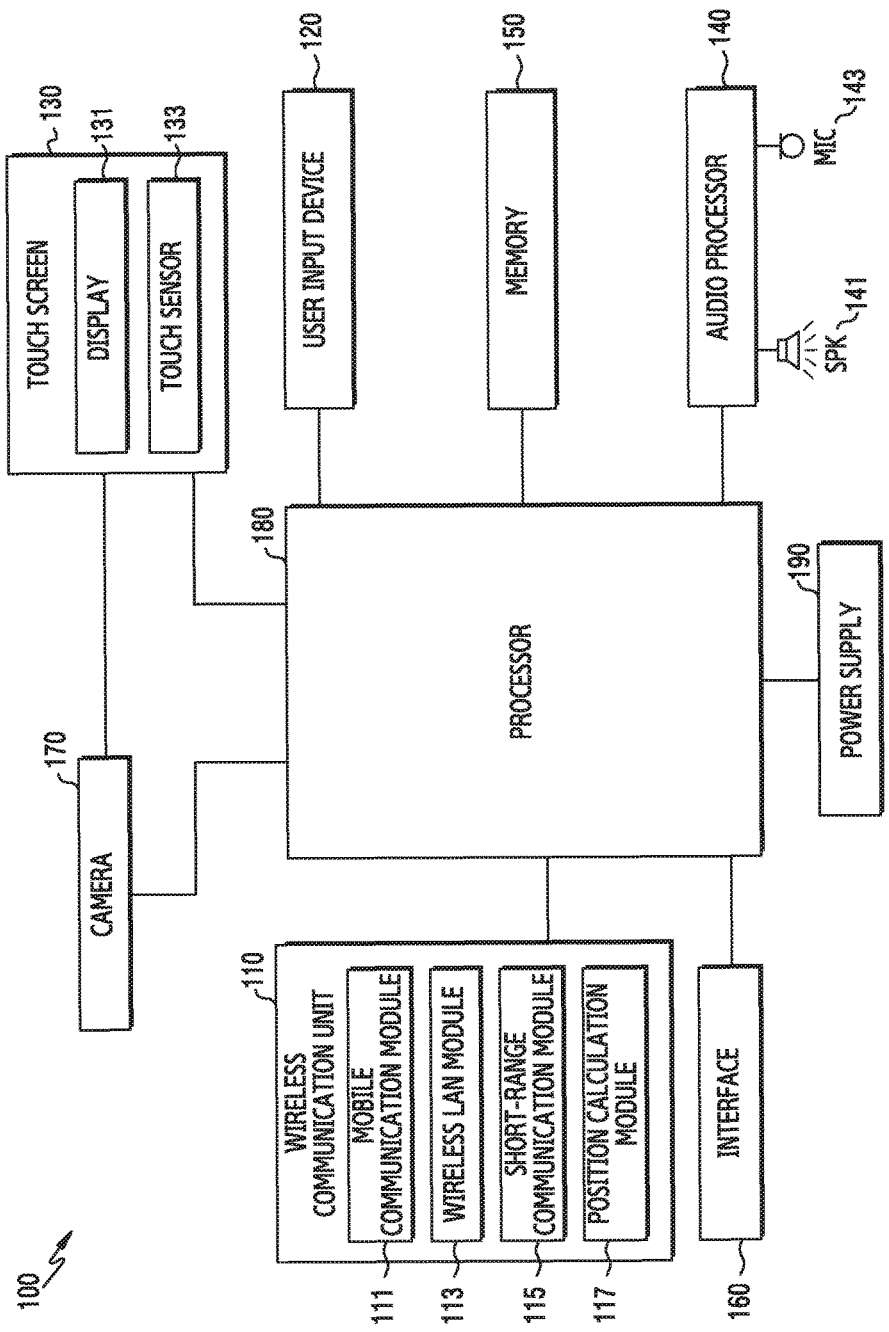
FIG. 1 is a diagram schematically illustrating a configuration of an electronic device according to various embodiments of the present disclosure.

The following description with reference to the accompanying drawings is provided to assist in a comprehensive understanding of various embodiments of the present disclosure as defined by the claims and their equivalents. It includes various to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments, an electronic device may include various devices using one or more among an application processor (AP), a communication processor (CP), a graphic processing unit (GPU), a central processing unit (CPU), and the like. According to various embodiments, the electronic device may include various devices, such as an information communication device, a multi-media device, a wearable device, an internet of things (IoT) device, or the like.

The electronic device according to various embodiments may include at least one of, for example, a smartphone, a tablet personal computer (PC), a mobile phone, a video phone, an e-book reader, a laptop PC, a netbook computer, a personal digital assistant (PDA), a portable multimedia player (PMP), a Moving Picture Experts Group (MPEG-1 or MPEG-2) audio layer-3 (MP3) player, a mobile medical device, and a camera. In some embodiments, the electronic device may include at least one of, for example, a television, a refrigerator, a home automation control panel, a media box (e.g., Samsung HomeSync™, Apple TV™, or Google TV™), an electronic dictionary, an electronic frame, and a point-of-sales (POS) terminal in a store. In various embodiments, the electronic device may be flexible, or may be a combination of two or more of the various devices described above. The electronic device according to various embodiments is not limited to the devices described above.

Further, in various embodiments, the term "user" may indicate a person using an electronic device or a device (e.g. an artificial intelligence electronic device) using the electronic device.

At least some of devices e.g., modules or functions thereof) or methods (e.g., operations) according to various embodiments may be implemented by a command which is stored a computer-readable storage medium (e.g., a memory) in a form of a program module. When the command is executed by a processor, the processor may perform a function corresponding to the command.

The computer-readable recording medium may be a hard disk, a floppy disk, a magnetic medium (e.g., a magnetic tape), an optical recording medium (e.g., a compact disc read only memory (CD-ROM), a digital versatile disc (DVD), a magneto-optical medium (e.g., a floptical disk)), built-in memory, and the like. The command may include a code compiled by a complier or a code that can be executed by an interpreter. A module or a programming module according to the present disclosure may include one or more of the aforementioned elements or may further include other additional elements, or some of the aforementioned elements may be omitted. The operations performed by a module, a programming module, or other elements according to various embodiments may be performed in a sequential, parallel, repetitive, or heuristic manner, and some of the operations may be performed in different orders or omitted, or other operations may be added.

Various embodiments of the present disclosure, to be proposed, provide an electronic device and an operation method therefor for providing a user interface (UI) in response to a change in the form of a display (e.g., a folded form (or a basic form), and an unfolded form (or an expanded form)). According to various embodiments, the electronic device may include various devices that can be used when a display is folded (hereinafter, folded) and is expanded by unfolding the display (hereinafter, unfolded), such as multiple displays, a flexible display, or a foldable display. In various embodiments, it is illustrated that the display is folded or unfolded, but this is only for convenience of illustration and is not for limitation thereto. For example, in various embodiments, the display may include forms of extension (extending or spreading) and shrinkage (e.g., a form of implementing multiple displays in a sliding manner).

According to various embodiments, the electronic device may provide a screen (e.g., a home screen) that is changed by another UI, such as a first UI or a second UI, according to a change in the form of a display (e.g., a folding (shrinking)/unfolding(expanding) operation). According to an embodiment, the first UI may include a home screen configured based on an application object (e.g., an icon) (hereinafter, referred to as a first object) set by a user, in a state where the display is in a basic screen mode (e.g., a folded (shrunk) state). According to an embodiment, the second UI may include a home screen configured based on an application object (e.g., an icon) and a mini application object (e.g., a widget) (hereinafter, referred to as a second object), in a state where the display is in an expanded screen mode (e.g., an unfolded (expanded) state).

According to various embodiments, the display may be switched between the first UI and the second UI and provided. According to an embodiment, when the display is switched from the basic screen mode to the expanded screen mode (e.g., from a folded state to an unfolded state), the electronic device may switch the first UI based on the first object to the second UI based on the first object and the second object, and display the second UI. According to an embodiment, when the display is switched from the expanded screen mode to the basic screen mode (e.g., from an unfolded state to a folded state), the electronic device may switch the second UI based on the first object and the second object to the first UI based on the first object, and display the first UI.

According to various embodiments, the electronic device may provide a UI (e.g., a home screen) based on the first object or a UT (e.g., a home screen) based on the first object and the second object, in response to a change in the form of the display (e.g., a change between a folded form and an unfolded form). According to various embodiments, when the display changes from a folded state to an unfolded state, a gap between first objects increases and second objects associated with the first objects are displayed in the increased gap (e.g., an empty area) between the first objects, so that the first objects and the second objects may be provided together in the unfolded state.

According to various embodiments, the electronic device may provide a UI based on the first object and the second object through the display when the display is unfolded, and the electronic device may provide a UI based on the first object through one screen of the display and provide a UI based on the second object through the other screen of the display when the display is folded.

Hereinafter, an operation method and a device, according to the various embodiments, will be described with reference to the accompanying drawings. However, since the various embodiments are not restricted or limited by the following description, it should be noted that applications can be made to the various embodiments based on embodiments that will be described below. Hereinafter, various embodiments of the present disclosure will be described based on a hardware approach. However, various embodiments of the present disclosure include technology that uses both hardware and software, and thus the various embodiments of the present disclosure may not exclude the use of software.

FIG. 1 is a diagram schematically illustrating a configuration of an electronic device according to various embodiments of the present disclosure.

Referring to FIG. 1, the electronic device 100 according to various embodiments may include, for example, a wireless communication unit 110, a user input device 120, a touch screen 130, an audio processor 140, a memory 150, an interface 160, a camera 170, a processor 180 (e.g., a processor including a processing circuit), and a power supply 190. In various embodiments of the present disclosure, the electronic device 100 is not necessarily required to have the elements illustrated in FIG. 1, but may be implemented to have more elements (e.g., a biometric recognition module (e.g., fingerprint recognition module), an illuminance sensor, a front camera, a proximity sensor, etc.) or fewer elements than the elements illustrated in FIG. 1. For example, the electronic device 100 according to various embodiments may not include some elements, such as the camera 170, depending upon the type thereof. According to various embodiments, the described elements of the electronic device 100 may be mounted in a housing (or a body) of the electronic device 100 or formed on the outside thereof.

The wireless communication unit 110 may include one or more modules which enable wireless communication between the electronic device 100 and another electronic device. For example, the wireless communication unit 110 may be configured to include a mobile communication module 111, a wireless local area network (WLAN) module 113, a short-range communication module 115, a position calculation module 117, and the like. In various embodiments, the wireless communication unit 110 may include a module (e.g., a short-range communication module, a long-distance communication module, etc.) for performing communication with a neighboring external device. According to various embodiments, at least some elements (e.g., the mobile communication module 111, the wireless LAN module 113, etc.) of the wireless communication unit 110, described below, may receive various kinds of information (e.g., push information) associated with the performance of an operation (or a function) of a mini application object (e.g., a widget).

The mobile communication module 111 may include, for example, a cellular module. The mobile communication module 111 may transmit a radio signal to or receive a radio signal from at least one of a base station, an external electronic device, and various servers (e.g., an application server, a management server, an integration server, a provider server, a content server, an Internet server, or a cloud server, etc.), on a mobile communication network. The radio signal may include a voice signal, a data signal, or various forms of control signals. The mobile communication module 111 may transmit various data necessary for an operation of the electronic device 100 to an external electronic device in response to a user request.

The wireless LAN module 113 may be a module for establishing wireless internet access and a wireless LAN link with other electronic devices. The wireless LAN module 113 may be embedded or enclosed in the electronic device 100. Wireless Internet technologies include Wi-Fi, wireless gigabit alliance (WiGig), wireless broadband (Wibro), world interoperability for microwave access (WiMAX), high speed downlink packet access (HSDPA), millimeter wave (mmWave), or the like. The wireless LAN module 113 may interwork with an external electronic device connected with the electronic device 100 through a network (e.g., a wireless Internet network), and may transmit various data of the electronic device 100 to the external electronic device or receive various data from the external electronic device. The wireless LAN module 113 may maintain a turned-on state at all times, or may be turned on or turned off according to a setting of the electronic device 100 or a user input.

The short-range communication module 115 may be a module for performing short-range communication. Short-range communication technologies may include Bluetooth, Bluetooth low energy (BLE), radio frequency identification (REID), infrared data association (IrDA), ultra wideband (UWB), ZigBee, near field communication (NFC), and the like. The short-range communication module 115 may interwork with an external electronic device connected through a network (e.g., a short-range communication network), and may transmit various data of the electronic device 100 to the external electronic device or receive various data from the external electronic device. The short-range communication module 115 may maintain a turned-on state at all times, or may be turned on or turned off according to a setting of the electronic device 100 or a user input.

The position calculation module 117 is a module for obtaining a position of the electronic device 100, and may include a global position system (GPS) module as a representative example. The position calculation module 117 may measure a position of the electronic device 100 using the principle of triangulation. The position information of the electronic device 100 may be obtained by various methods.

The user input device 120 may generate input data for controlling an operation of the electronic device 100 in response to a user input. The user input device 120 may include at least one input device for detecting various inputs of a user. For example, the user input device 120 may include a keypad, a dome switch, a physical button, a touch pad (resistive type/capacitive type), a jog & shuttle, a sensor, etc. According to an embodiment, the user input device 120 may include an electronic pen. According to an embodiment, the user input device 120 may be implemented to receive an input corresponding to the force of a touch.

In various embodiments, a sensor may, for example, measure a physical quantity or sense an operation state of the electronic device 100 and convert the measured or sensed information into an electrical signal. The sensor may include a force sensor, an iris scan sensor, a finger scan sensor, an image sensor, an illuminance sensor, and the like. In addition, the sensor may include at least one of a gesture sensor, a gyro sensor, a pressure sensor, a magnetic sensor, an acceleration sensor, a terrestrial sensor, a motion recognition sensor, a grip sensor, a proximity sensor, a color sensor (e.g., a red, green, blue (RGB) sensor), a medical sensor, a temperature-humidity sensor, an ultra violet (UV) sensor, and a heart rate monitor (HRM) sensor. Further, the sensor may include, for example, an E-nose sensor, an electromyography (EMG) sensor, an electroencephalogram (EEG) sensor, an electrocardiogram (ECG) sensor, and an infrared (IR) sensor, etc.

A part of the user input device 120 may be implemented in a button form outside of the electronic device 100, and all or part of the user input device 120 may be implemented as a touch panel. The user input device 120 may receive a user input for initiating an operation (e.g., a function of changing a display 131 form, a UI switching function, a power on/off function, an audio reproduction function, an on/off function of the camera 170, etc.) of the electronic device 100 according to various embodiments, and may generate an input signal according to a user input. According to an embodiment, the user input device 120 may include an electronic pen that can be attached to or detached from the electronic device 100.

The touch screen 130 may be an input/output device capable of simultaneously performing an input function and a display function, and may include the display 131 and a touch sensor 133. The touch screen 130 may provide an input/output interface between the electronic device 100 and a user, transfer a touch input of the user to the electronic device 100, and function as a medium that shows an output from the electronic device 100 to the user. The touch screen 130 may show a visual output to the user. The visual output may be shown in a form of text, graphics, video, or a combination thereof.

The display 131 may display (output) various information processed by the electronic device 100. For example, the display 131 may display a graphic user interface (GUI) or various UIs associated with the use of the electronic device 100. According to various embodiments, the display 131 may display a GUI or a UI associated with various operations performed by the electronic device 100. Various screen examples, in the electronic device 100 according to various embodiments, of switching a related UI in response to a change in the form of the display 131 and configuring a home screen based on the switched UI will be described in detail with reference to the drawings to be described later.

According to various embodiments, the display 131 may be one display 131 or at least one display 131 depending on the form of the electronic device 100. In example, the display 131 may be one display 131 (e.g., a rollable display). For another example, the display 131 may be divided into a first display and a second display (e.g., a foldable display that is folded once). In still another example, the display 131 may be divided into a first display, a second display, and a third display (e.g., a foldable display that is folded twice).

Various kinds of displays may be used as the display 131. For example, the display 131 may include a liquid crystal display (LCD), a light-emitting diode (LED) display, an organic LED (OLED) display, a micro-electro-mechanical Systems (MEMS) display, and an electronic paper display. Some displays may be implemented as a transparent display in a transparent or photo-transparent type. In various embodiments, a flexible display may be used as the display 131. For example, the display 131 may include a flat display or a display that is foldable (or rollable) without damage owing to a flexible substrate as thin as paper. The display 131 may be fastened to the housing to maintain a folded or unfolded form. In various embodiments, the electronic device 100 may be implemented as a display device capable of bending and spreading freely like a flexible display. According to various embodiments, flexibility in folding and unfolding may be imparting to the display 131 by replacing, with a plastic film, a glass substrate wrapping a liquid crystal in a variety of displays based on the above description.

The touch sensor 133 may be mounted in the display 131, and may sense a user input contacting or approaching the surface of the touch screen 130. The user input may include a touch input or a proximity input based on at least one of a single-touch, multiple touches, hovering, or an air gesture. The touch sensor 133 may receive a user input for initiating an operation associated with the use of the electronic device 100, and generate an input signal according to the user input. The touch sensor 133 may be configured to convert a pressure applied to a specific part of the display 131 or a change in a capacitance generated in a specific part of the display 131 into an electrical input signal. The touch sensor 133 may detect a position and an area where an input tool (e.g., a user's finger, an electronic pen, or the like) touches or approaches the surface of the display 131. Further, the touch sensor 133 may be implemented to detect even a pressure (e.g., a force of touch) at the time of touching depending on the touch scheme that is applied.

The audio processor 140 may transmit, to a speaker (SPK) 141, an audio signal input from a processor 180, and may perform a function of transferring an audio signal such as a voice input from a microphone (MIC) 143 to the processor 180. The audio processor 140 may convert voice/sound data into an audible sound and output the audible sound through the SPK 141 under the control of the processor 180 and convert an audio signal, such as a voice, received from the microphone 143 into a digital signal to transfer the digital signal to the processor 180.

The SPK 141 may output audio data received from the wireless communication unit 110 or stored in the memory 150. The SPK 141 may output a sound signal associated with various operations (functions) performed by the electronic device 100.

The microphone 143 may receive an external sound signal and process the sound signal into electric voice data. Various noise reduction algorithms may be implemented in the microphone 143 to remove noise generated in a procedure of receiving an external sound signal. The microphone 143 may be responsible for input of an audio stream, such as a voice command, etc. For example, the microphone 143 may receive a voice command for initiating a card registration operation.

The memory 150 may store one or more programs executed by the processor 180 and may also perform a function of temporarily storing input/output data. For example, the input/output data may include a file, such as a video, an image, a picture, audio, or data (e.g., weather information, stock information, financial information, news information, mail information, message information, social network service (SNS) information, etc.) associated with a mini application (e.g., a widget). The memory 150 may serve to store acquired data, and may store data acquired in real time in a temporary storage device and data, which is determined to be stored, in a storage device which can store the data for a long time.

In various embodiments, the memory 150 may store one or more programs, data, or instructions in association with which the processor 180 (e.g., a processor including a processing circuit) causes an operation state of the display 131 to be determined, causes a first UI based on a first object (e.g., an application icon) to be displayed according to a basic arrangement when the operation state is a first state (e.g., a basic operation mode, for example, a folded state, etc.), and causes a second UI based on the first object and a second object associated with the first object to be displayed according to an expanded arrangement when the operation state is a second state (e.g., an expanded operation mode, for example, an unfolded state, a changed state, an expanded state, etc.). According to various embodiments, the memory 150 may store one or more programs, data, or instructions associated with detecting a change of a state where the form of the display 131 changes, and increasing the size of an empty area between first objects and displaying second objects in the empty area when the change of a state occurs from the first state to the second state. According to various embodiments, the memory 150 may store one or more programs, data, or instructions associated with detecting a change of a state where the form of the display 131 changes, and reducing the size of an empty area between first objects and discontinuing the display of second objects when the change of a state occurs from the second state to the first state.

The memory 150 may include one or more application modules (or software modules). For example, the memory 150 may include an electronic payment application module, a membership-related application module, a card registration-related application module, a barcode recognition application module, and the like.

The interface 160 may receive data transmitted from another electronic device or receive power supplied from another electronic device, and may transfer the data or the power to respective elements inside the electronic device 100. The interface 160 may cause data inside the electronic device 100 to be transmitted to another electronic device. For example, the interface 160 may include a wired/wireless headset port, an external charger port, a wired/wireless data port, a memory card port, an audio input/output port, a video input/output port, an earphone port, and the like.

The camera 170 shows a configuration for supporting a photographing function of the electronic device 100. The camera 170 may photograph a subject and transfer photographed data (e.g., an image) to the display 131 and the processor 180 under the control of the processor 180. According to various embodiments, the camera 170 may include, for example, a first camera (e.g., a color (RGB) camera) for acquiring color information and a second camera (e.g., an IR camera) for acquiring depth information (e.g., position information and distance information of a subject). The camera 170 may include an image sensor. The image sensor may be implemented as a charge-coupled device (CCD) or a complementary metal-oxide semiconductor (CMOS).

According to an embodiment, the first camera may be a front camera provided on the front surface of the electronic device 100. According to various embodiments, the front camera may be replaced by the second camera, and may not be provided on the front surface of the electronic device 100. According to an embodiment, the first camera may be placed together with the second camera on the front surface of the electronic device 100. According to an embodiment, the first camera may be a rear camera provided on the rear surface of the electronic device 100. According to an embodiment, the first camera may have a form of including both the front camera and the rear camera provided respectively on the front surface and the rear surface of the electronic device 100.

The processor 180 (e.g., a processor including a processing circuit) may control the overall operation of the electronic device 100. In various embodiments, the processor 180 may include one or more processors, or may be referred to as a processor. For example, the processor 180 may include a CP, an AP, an interface (for example, general purpose input/output (GPIO)), or an internal memory, as separate components, or integrate them into one or more integrated circuits. According to an embodiment, the AP may execute various software programs to perform various functions of the electronic device 100, and the CP may perform processing or control for voice communication and data communication. The processor 180 may be responsible for executing a predetermined software module (e.g., a command set (an instruction set)) stored in the memory 150 and performing several predetermined functions corresponding to the module.

In various embodiments, the processor 180 may control an operation of a hardware module, such as the audio processor 140, the interface 160, the display 131, the camera 170, and the like. According to various embodiments, the processor 180 may be electrically and/or functionally connected with the display 131 and the memory 150 of the electronic device 100.

According to embodiment, the processor 180 may process an operation of providing a UI in response to a change in the form of the display 131. According to various embodiments, the processor 180 may control an operation of determining an operation state of the display 131, an operation of displaying a first UI based on a first object according to a basic arrangement when the operation state is a first state, and an operation of displaying a second UI based on the first object and a second object associated with the first object according to an expanded arrangement when the operation state is a second state. According to various embodiments, the processor 180 may control an operation of sensing a change of a state where the form of the display 131 changes and an operation of increasing the size of an empty area between first objects and displaying second objects in the empty area when the change of a state occurs from the first state to the second state. According to various embodiments, the processor 180 may control an operation of sensing a change of a state where the form of the display 131 changes, and an operation of reducing the size of an empty area between first objects and discontinuing the display of second objects when the change of a state occurs from the second state to the first state.

The control operation of the processor 180 according to various embodiments will be described in detail with reference to the drawings to be described later.

The power supply 190 may receive external power and internal power and supply power required for operating the elements under the control of the processor 180. In various embodiments, the power supply 190 may supply or block (i.e., turning on or off) power to the wireless communication unit 110, the display 131, the camera 170, and the like. According to various embodiments, the power supply 190 may include, for example, a battery control circuit. For example, the power supply 190 may include a battery (e.g., a rechargeable battery) and/or a solar battery, a circuit for measuring the remaining charge in a battery (e.g., a fuel gauge), a power management integrated circuit (PMIC), a charging circuit, a booster circuit, and the like.

As discussed above, the electronic device according to various embodiments may include a display that displays a UI corresponding to an operation state of the display, and a processor electrically connected with the display, in which the processor may be configured such that an operation state of the display is determined, a first UI based on a first object is displayed according to a basic arrangement when the operation state is a first state, and a second UI based on the first object and a second object associated with the first object is displayed according to an expanded arrangement when the operation state is a second state, and the second object may be configured to be displayed in an area adjacent to the first object, corresponding to the expanded arrangement.

According to various embodiments, the first object may be configured to include an application icon, and the second object may be configured to include a mini application associated with the first object.

According to various embodiments, the processor may be configured such that the operation state of the display is determined in response to an operation in which the display is used.

According to various embodiments, the processor may be configured such that a change of a state, in which the form of the display changes, is sensed, and then, when the change of a state occurs from the first state to the second state, the size of an empty area between the first objects is increased and the second objects are displayed in the empty area.

According to various embodiments, the processor may be configured such that a switching effect using a widget shadow is displayed through the empty area between the first objects, corresponding to a direction in which the change of a state progresses, when the change of a state occurs from the first state to the second state.

According to various embodiments, the processor may be configured such that a change of a state, in which the form of the display changes, is sensed, and then, when the change of a state occurs from the second state to the first state, the size of an empty area between the first objects is reduced and the display of the second objects is discontinued.

According to various embodiments, the processor may be configured such that the first object is allocated to a first screen of the display and the second object is allocated to a second screen of the display, when a state changes from the second state to the first state.

According to various embodiments, the processor may be configured such that the first object is displayed when the display is used based on the first screen, and the second object is displayed when the display is used based on the second screen, in which the first screen and the second screen may be configured to be switched in response to flipping of the electronic device, and one of the first screen and the second screen, which is not used, may be configured to be deactivated.

According to various embodiments, the processor may be configured such that an empty area is provided in the second UI when the second object associated with the first object does not exist.

According to various embodiments, the processor may be configured such that an image obtained by capturing the last execution screen of an application corresponding to the first object is provided when the second object associated with the first object does not exist.

According to various embodiments, the processor may be configured such that, when a state changes from the first state to the second state, the first object is replaced with the second object and a third UI based on the second object is displayed, in which the second object may be configured to include a mini application associated with the first object, and an empty area or an image obtained by capturing the last execution screen of an application may be configured to be provided in an area corresponding to the second object in the third UI when the second object corresponding to the first object does not exist.

Figure 2:
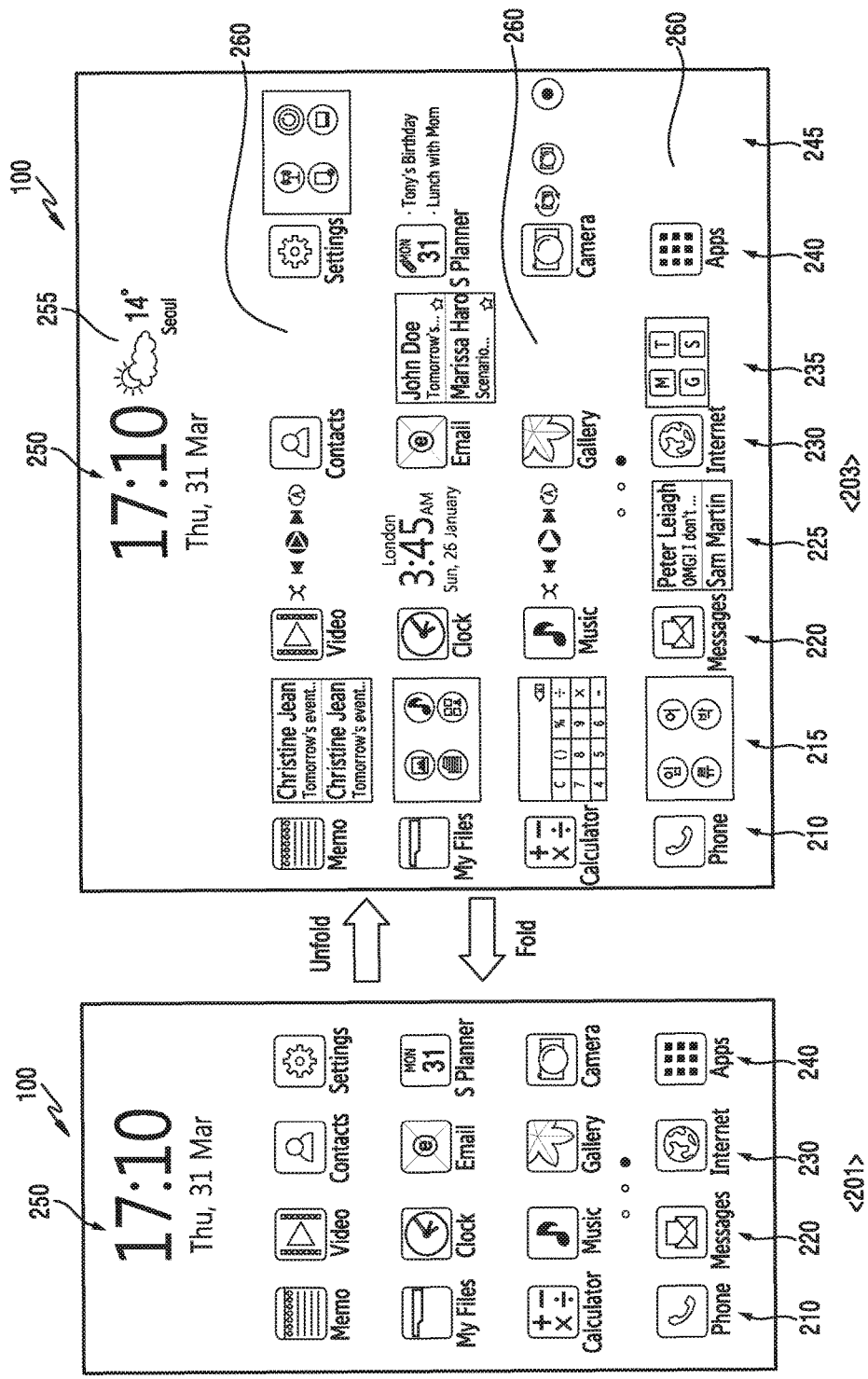
FIG. 2 is a diagram illustrating an example of a user interface (UI) provided in an electronic device according to various embodiments of the present disclosure.

FIG. 2 is a diagram illustrating an example of a UI provided in an electronic device according to various embodiments of the present disclosure.

Referring to FIG. 2, example screen 201 may show an example of a UI (hereinafter, referred to as a first UI) provided when the electronic device 100 operates in the basic screen mode. For example, example screen 201 may show a case where the form of the display 131 of the electronic device 100 is a folded form (or a basic form, or a shrunk form). Example screen 203 may show an example of a UI (hereinafter, referred to as a second UI) provided when the electronic device 100 operates in the expanded screen mode. For example, example screen 203 may show a case where the form of the display 131 of the electronic device 100 is an unfolded form (or an expanded form).

As illustrated in example screen 201, the first UI may provide a home screen (hereinafter, a first home screen) corresponding to a user's setting. According to an embodiment, the electronic device 100 may have one or more applications installed therein, and may provide application icons 210, 220, 230, 240, and 250, which can execute the applications, through a home screen operating in a horizontal direction. In various embodiments, unlike other application icons 210, 220, 230, and 240, the application icon 250 may be an application (e.g., a clock application) pre-set by the electronic device 100, and may have, for example, an independent arrangement (e.g., arranged in the middle of a first column, or the center of a first row). According to various embodiments, the application icon 250 may not be included in the home screen, or may be included in the home screen in an arrangement the same as or similar to that of the other application icons 210, 220, 230, and 240. Hereinafter, it is assumed that the application icon 250 is not included in a basic arrangement but is set to have an independent arrangement (for example, a fixed position). Hereinafter, in a case of the application icon 250, related descriptions may or may not include reference numeral "250" for the convenience of description.

In various embodiments, the application icons 210, 220, 230, 240, and 250 may be trigger objects for executing corresponding applications (or functions) to display an execution screen associated with the application through the display 131.

According to various embodiments, the first home screen may have at least one page and various screen configurations (or arrangements) (e.g., 4×4, 4×5, and 5×5) corresponding to a vertical operation mode (e.g., a vertical mode) according to a user's setting. According to an embodiment, illustrating a 4×4 screen configuration, when the number of application icons 210, 220, 230, and 240 exceeds 16, excess application icons (not shown) may be placed on the next page. The arrangement positions of the application icons 210, 220, 230, 240 and 250 may be variously implemented according to the setting of the electronic device 100.

As illustrated in example screen 203, the second UI may provide a home screen (hereinafter, referred to as a second home screen) different from the first home screen. According to an embodiment, the electronic device 100 may install, in addition to applications, mini applications (hereinafter, referred to as widgets) 215, 225, 235, 245, and 255 which are associated with or independent of the applications.

In various embodiments, the widgets 215, 225, 235, 245, and 255 may be, for example, mini applications that enable direct use and/or checking of various functions (e.g., a weather function, a calendar function, a calculator function, a memo function, a mail function, a clock function, etc.) and various information (e.g., information on weather, games, stock quotes, mail, news, SNS, messages, etc.), without going through an application (e.g., a web browser) in the electronic device 100. For example, the widgets 215, 225, 235, 245, and 255 may represent mini applications, i.e., one of a GUI that more smoothly supports interaction between a user and an application or an operating system. For example, the widgets 215, 225, 235, 245, and 255 are small-sized applications containing various functions, such as a weather function, a calculator function, a clock function, etc., and various information (e.g., contents), and a user may directly use or check various related services through the widgets 215, 225, 235, 245, and 255 without launching full applications.

In various embodiments, the second home screen may include a form that is a horizontally expanded form of the first home screen. According to various embodiments, the second home screen may include first icons (first objects, or application icons) 210, 220, 230, 240, and 250 of the first home screen and second icons (widgets) 215, 225, 235, 245, and 255 associated with applications corresponding to the first icons 210, 220, 230, 240, and 250. According to an embodiment, the second icons 215, 225, 235, 245, and 255 may be provided in an area (e.g., the right side or the lower side of a target first object) adjacent to the respectively corresponding first icons 210, 220, 230, 240, and 250. For example, the second icons 215, 225, 235, 245, and 255 may be provided adjacent to one side (e.g., the right side, in FIG. 2) of the corresponding first icons 210, 220, 230, 240 and 250, respectively.

According to an embodiment, when the display 131 is unfolded (e.g., screen expansion in a horizontal direction) in a vertical operation mode (e.g., a vertical mode), for example, when the display 131 changes in such a manner as changing from example screen 201 to example screen 203, a space (or gap) between the first icons 210, 220, 230, 240, and 250 may increase. For example, the space between the first icons 210, 220, 230, 240, and 250 may increase in a horizontal direction by a ratio corresponding to a ratio of the screen expanded in a horizontal direction. Here, a reference column may be an icon group 210 of the leftmost column of example screen 201, and empty areas may be generated between the right and left icons by shifting icons 220, 230, and 240 in the right side of the icon group 210 of the reference column to the right in an amount corresponding to a set space. According to an embodiment, the first icon 250 may have an empty area generated in the right side thereof in response to an increase in the space between the other first icons 210, 220, 230, and 240. According to an embodiment, the space (e.g., gap) between the first icons 210, 220, 230, 240, and 250 may be increased or decreased at an identical ratio starting from the reference column (e.g., the icon group 210). According to an embodiment, when it is assumed that the space (e.g., a gap between icons in an X-axis direction) between icons in example screen 201 is "M", the space (e.g., a gap between icons in an X-axis direction) between icons in example screen 203 may have a value larger than M, for example, M×2, M×2.5, or the like.

According to various embodiments, the electronic device 100 may display the first UI or the second UI, as described above, according to a form in which the display 131 is changed.

According to various embodiments, the electronic device 100 may provide the home screen using different UIs, such as the first UI or the second UI, according to a change in the form of the display 131, such as folding or unfolding of the display 131. According to an embodiment, the first UI may include the first home screen configured based on application icons (e.g., first objects, or application icons) set by a user, in the basic screen mode (e.g., a folded (shrunk) state) of the display 131. According to an embodiment, the second UI may include the second home screen configured based on application icons (e.g., first icons 210, 220, 230, 240, and 250) and mini application icons (e.g., second icons 215, 225, 235, 245, and 255, i.e., widgets) associated with the application icons, in the expanded screen mode an unfolded (expanded) state) of the display 131.

According to various embodiments, the electronic device 100 may switch and provide the first UI and the second UI in real time according to a change in the form of the display 131.

According to an embodiment, when the display 131 is switched from the basic screen mode to the expanded screen mode (e.g., from a folded state to an unfolded state), the electronic device 100 may switch the first UI based on the first icons 210, 220, 230, 240, and 250 to the second UI based on the first icons 210, 220, 230, 240, and 250 and the second icons 215, 225, 235, 245, and 255, and then display the second UI. According to an embodiment, when the display 131 is switched from the expanded screen mode to the basic screen mode (e.g., from an unfolded state to a folded state), the electronic device 100 may switch the second UI based on the first icons 210, 220, 230, 240, and 250 and the second icons 215, 225, 235, 245, and 255 to the first UI based on the first icons 210, 220, 230, 240, and 250, and then display the first UI. According to various embodiments, the electronic device 100 may switch and provide, in real time, the home screen based on icons or the home screen based on icons and widgets by refreshing the home screen, in response to a change in the form of the display 131 (e.g., from a folded form to an unfolded form, or from an unfolded form to a folded form).

According to various embodiments, the second icons (e.g., widgets) may be provided as the widgets 215, 225, 235, 245, and 255 associated with the application icons 210, 220, 230, 240, and 250, which are located in the left side, the right side, the upper side, or the lower side, according to a direction in which the display 131 is expanded. For example, the widgets 215, 225, 235, 245, and 255 may be displayed by calling the widgets 215, 225, 235, 245, and 255 associated with target application icons 210, 220, 230, 240, and 250, in empty areas between the application icons 210, 220, 230, 240, and 250, the spaces between which are increased in the direction in which the display 131 is expanded.

In the example of FIG. 2, the display 131 is expanded in the right direction and widgets associated with icons are set to the left of the icons, but various embodiments are not limited thereto. According to an embodiment, when the display 131 is expanded in the right direction, widgets 215, 225, 235, 245, and 255 associated with the left icons 210, 220, 230, 240, and 250 may be called and displayed to be associated with corresponding icons 210, 220, 230, 240, and 250 in empty areas of the right side of the icons 210, 220, 230, 240, and 250. According to an embodiment, when the display 131 is expanded in the left direction, widgets 215, 225, 235, 245, and 255 associated with the right icons 210, 220, 230, 240, and 250 may be called and displayed to be associated with corresponding icons 210, 220, 230, 240, and 250 in empty areas of the left side of the icons 210, 220, 230, 240, and 250. According to an embodiment, when the display 131 is expanded in the lower direction, widgets 215, 225, 235, 245, and 255 associated with the upper icons 210, 220, 230, 240, and 250 may be called and displayed to be associated with corresponding icons 210, 220, 230, 240, and 250 in empty areas of the lower side of the icons 210, 220, 230, 240, and 250. According to an embodiment, when the display 131 is expanded in the upper direction, widgets 215, 225, 235, 245, and 255 associated with the lower icons 210, 220, 230, 240, and 250 may be called and displayed to be associated with corresponding icons 210, 220, 230, 240, and 250 in empty areas of the upper side of the icons 210, 220, 230, 240, and 250. For example, the electronic device 100 may display widgets 215, 225, 235, 245, and 255 associated with icons 210, 220, 230, 240, and 250 to be adjacent to the right side, the left side, the upper side, or the lower side of corresponding icons 210, 220, 230, 240, and 250, according to an expansion direction of the display 131.

According to various embodiments, when widgets corresponding to the first icons 210, 220, 230, 240, and 250 do not exist, an empty area 260 may be provided in a location corresponding to the icon in the second home screen. For example, a widget may be displayed as a blank without displaying the widget in the location corresponding to the icon.

According to various embodiments, when widgets corresponding to the first icons 210, 220, 230, 240, and 250 do not exist, an image obtained by capturing the last execution screen of an application corresponding to the icon may be provided. For example, in the second home screen, a captured image (e.g., a thumb nail image obtained by capturing the last execution screen) associated with a corresponding icon may be provided in a widget form in a location corresponding to the corresponding icon that has no widget corresponding thereto. According to an embodiment, when a widget is displayed according to expansion of the display 131, in a case where there is no widget corresponding to an icon, an image may be obtained by capturing the last execution screen of a corresponding application, and then displaying the captured image in a location of a widget corresponding to the icon. According to an embodiment, in a case of a browser icon, the last displayed web page screen may be captured and displayed. According to an embodiment, when a user selects (e.g., touches) an icon, a predesignated function (e.g., a browser function) corresponding to the icon may be executed, and when the user selects a captured image, the user may directly go to a corresponding execution screen (e.g., the entire screen corresponding to a captured screen or a web page of a related site).

For example, in various embodiments, depending on the configuration of the electronic device 100, when widgets (or mini applications) corresponding to icons 210, 220, 230, 240, and 250 do not exist, an empty area or an image obtained by capturing the last execution screen of a corresponding application having no widget is provided in a location at which a widget is to be displayed according to the space between the icons.

Hereinafter, examples of various display 131 types provided in the electronic device 100 according to various embodiments will be described.

Figure 3:
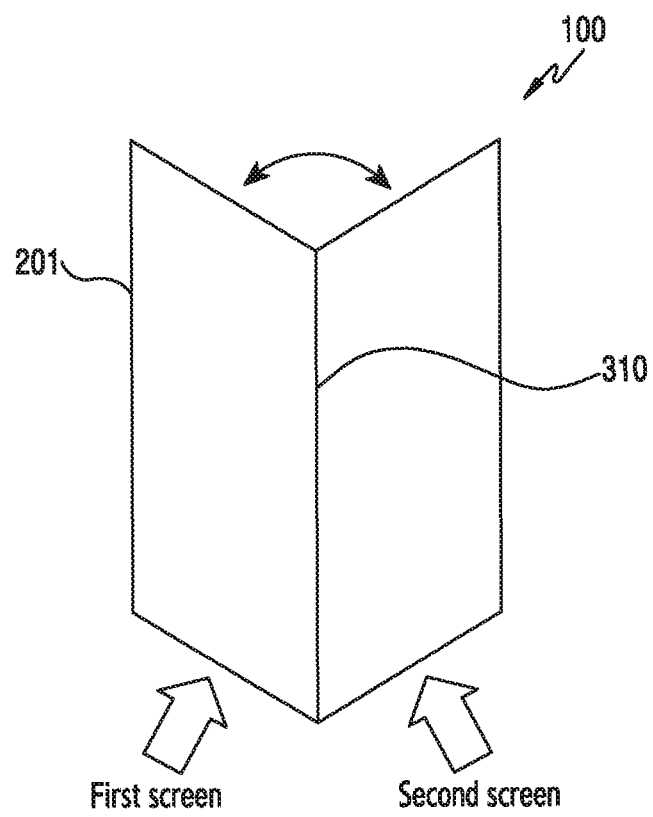
FIG. 3, FIG. 4, and FIG. 5 are diagrams illustrating examples of changing a display form according to a display type in an electronic device according to various embodiments of the present disclosure.
Figure 4:
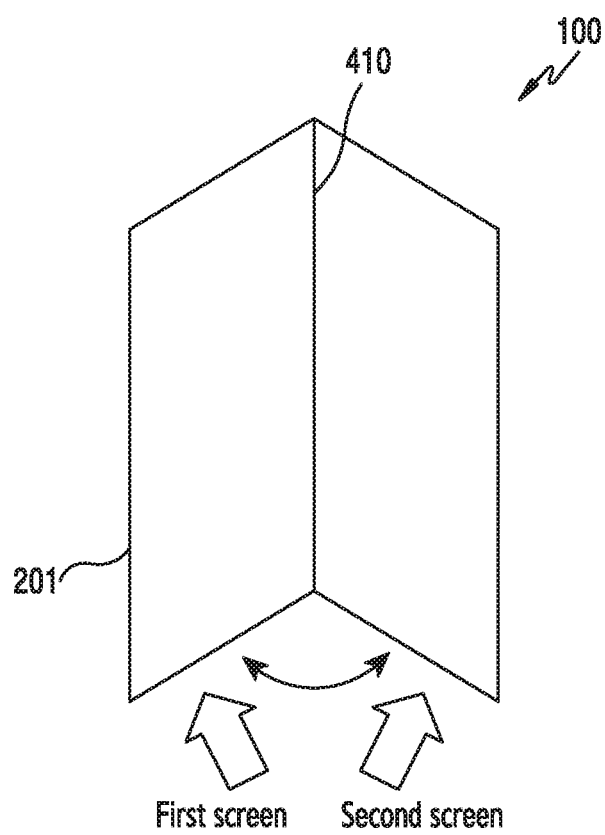
Figure 5:
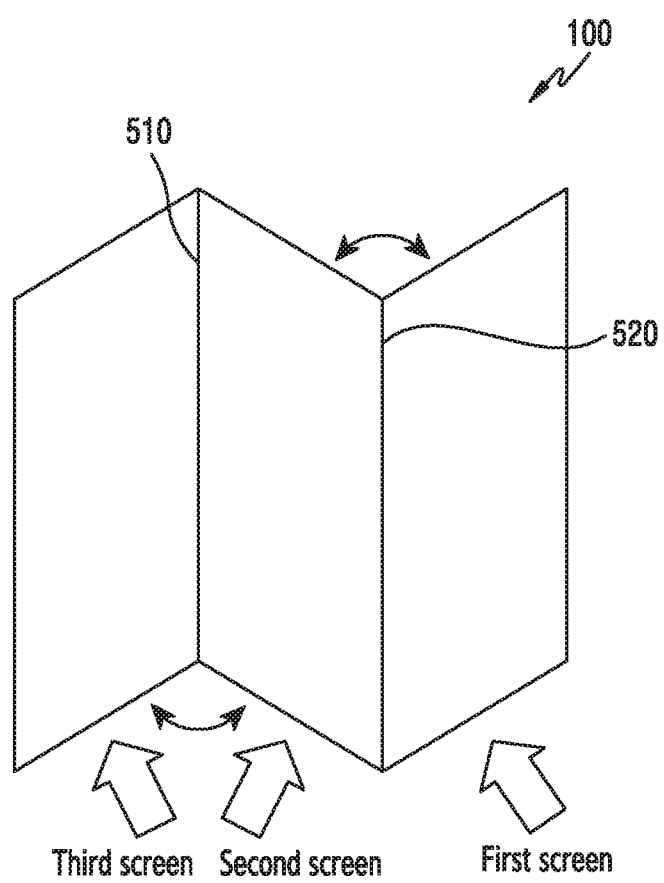

FIGS. 3, 4, and 5 are diagrams illustrating examples of changing a display form according to a display type in an electronic device according to various embodiments of the present disclosure.

Referring to FIGS. 3, 4, and 5, the electronic device 100 may be implemented in various forms, and the display 131 may be folded and unfolded in various schemes depending on the implementation form of the electronic device 100.

As illustrated in FIGS. 3, 4, and 5, FIGS. 3 and 4 may show an example in which the electronic device 100 has one folding axis 310 and 410, and FIG. 5 may show an example in which the electronic device 100 has two folding axes 510 and 520. However, various embodiments are not limited to the examples above, and this is illustrative only. Further, the number of folding axes of the electronic device 100 may have is not limited.

Referring to FIG. 3, the electronic device 100 may include a vertical folding axis 310 passing through the center of the electronic device 100. Thus, the electronic device 100 may be folded, unfolded, or bent with respect to the folding axis 310. In various embodiments, FIG. 3 may show a form in which the display 131 (e.g., a first screen, and a second screen) of the electronic device 100 is folded outward so as to be exposed to the outside of the electronic device 100. For example, FIG. 3 may correspond to a form in which the display 131 is implemented on each of the front screen (the first screen) and the rear screen (the second screen) of the electronic device 100, and the display 131 is folded outward so as to be exposed to the outside.

In the form of the electronic device 100 shown in FIG. 3, a state where the electronic device 100 is fully folded may refer to a state where two parts (e.g., housings) included on one surface (e.g., the rear surface) of the electronic device 100, on which the display 131 is not implemented, face each other, so that the two parts are completely parallel or nearly parallel. For example, a state where the electronic device 100 is fully folded may refer to a state where the two parts included on one surface of the electronic device 100 do not necessarily contact each other, but are disposed in close proximity. In the form of the electronic device 100 shown in FIG. 3, a state where the electronic device 100 is fully unfolded may be a state where the display 131 on the front screen (e.g., the first screen) and the display 131 on the rear screen (e.g., the second screen) of the electronic device 100 are exposed to the outside to form a plane like one single display 131, and may be a state where the area of the display 131 exposed to the outside is the largest, or close to the largest.

Referring to FIG. 4, the electronic device 100 may include a vertical folding axis 410 passing through the center of the electronic device 100. Thus, the electronic device 100 may be folded, unfolded, or bent with reference to the folding axis 410. In various embodiments, FIG. 4 may show a form of being folded inward so that the display 131 (e.g., a first screen, and a second screen) of the electronic device 100 is not exposed to the outside of the electronic device 100. For example, FIG. 4 may correspond to a form in which the display 131 is implemented on each of the front screen (the first screen) and the rear screen (the second screen) of the electronic device 100, and the display 131 is folded inward to prevent the display 131 from being exposed to the outside.

In the form of the electronic device 100 shown in FIG. 4, a state where the electronic device 100 is fully folded may refer to a state where two parts (e.g., housings) included on one screen (e.g., one screen of the display 131) of the electronic device 100 face each other, so that the two parts are completely parallel or nearly parallel. For example, a state where the electronic device 100 is fully folded may refer to a state where the two parts included on one screen of the electronic device 100 do not necessarily contact each other, but are disposed in close proximity. In the form of the electronic device 100 shown in FIG. 4, a state where the electronic device 100 is fully unfolded may be a state where the display 131 on the first screen and the display 131 on the second screen of the electronic device 100 are exposed to the outside to form a plane like one single display 131, and may be a state where the area of the display 131 exposed to the outside is the largest, or close to the largest.

In examples of FIGS. 3 and 4, the folding axis 310 and 410 is illustrated as passing through the center of the electronic device 100. However, the folding axis 310 and 410 may be located in any place in the electronic device 100. For example, the electronic device 100 may be folded or bent asymmetrically with respect to the folding axis 310 and 410, and two faces divided by the folding axis may be different in size (or the size of each display 131 separated after folding) in a state where the electronic device 100 is folded. Further, depending on a folded degree of the electronic device 100, the electronic device 100 may be in a fully folded state or in an intermediate state between the fully folded state and a fully unfolded state.

According to various embodiments, the electronic device 100 may sense a folded state or a folded degree of the electronic device 100. According to various embodiments, the electronic device 100 may senses the folded state or the folded degree and, based thereon, activate or deactivate a partial area of the display 131 employed in the electronic device 100. According to an embodiment, in a manner similar to that of FIG. 3, when the electronic device 100 senses the folded state of the electronic device 100, the electronic device 100 may determine the display 131 (e.g., the front screen (the first screen) or the rear screen (the second screen)) which is used, activate one screen of the display 131, which is used, based on a result of the determination, and deactivate the other screen of the display 131, which is not used. According to an embodiment, in a manner similar to that of FIG. 4, when the electronic device 100 senses the folded state of the electronic device 100, the electronic device 100 may deactivate all screens (e.g., the first screen and the second screen) of the display 131.

Referring to FIG. 5, FIG. 5 shows an example of the electronic device 100 including two folding axes 510 and 520. FIG. 5 may show an example in which each of the two folding axes 510 and 520 is employed in a vertical direction to trisect the electronic device 100. Thus, the electronic device 100 may be folded, unfolded, or bent with respect to the folding axes 510 and 520. In various embodiments, as illustrated in FIG. 5, the electronic device 100 may have different directions of folding or bending with respect to each of the folding axes 510 and 520. The electronic device 100 may have an identical direction of folding or bending with respect to each of the folding axes 510 and 520. According to an embodiment, as illustrated in FIG. 5, the electronic device 100 may have the display 131 of the first screen exposed to the outside, the rear surface of the first screen and the rear surface of the second screen folded face to face, and the display 131 of the second screen and the display 131 of the third screen folded face to face.

According to various embodiments, depending on a location at which the two folding axes 510 and 520 are employed on the electronic device 100, the electronic device 100 may be folded or bent asymmetrically with respect to each of the two folding axes 510 and 520, and even when the electronic device 100 is fully folded with respect to the two folding axes 510 and 520, respective surfaces of the electronic device 100, which are divided by the folding axes 510 and 520 may not completely overlap. According to various embodiments, even when the electronic device 100 illustrated in FIG. 5 is provided with the folding axes 510 and 520, the display 131 may be employed on the front surface and/or the rear surface of the electronic device 100, and the display 131 employed in the electronic device 100 may be activated or deactivated in a manner similar to that described in the description part with reference to FIGS. 3 and 4.

According to various embodiments, the electronic device 100 may detect a change (e.g., folding and unfolding) in the form of the display 131 based on various schemes.

According to an embodiment, the electronic device 100 may include at least one state detection sensor (not illustrated). For example, the state detection sensor may be located in one side (e.g., a folding axis, a housing end, a bezel of facing displays 131, etc.) of the electronic device 100 to measure the unfolding angle of the electronic device 100. The unfolding angle may indicate an angle formed by the folding axis and two surfaces divided by the folding axis, in the electronic device 100. The electronic device 100 may measure the unfolding angle to determine whether the electronic device 100 is fully folded, bent, or unfolded. The electronic device 100 may determine that the display 131 of the electronic device 100 is fully unfolded when the unfolding angle measured by the electronic device 100 is 180 degrees or an angle close thereto. The electronic device 100 may determine that the display 131 of the electronic device 100 is fully folded when the unfolding angle measured by the electronic device 100 is 0 degrees or an angle close thereto. According to various embodiments, the electronic device 100 may determine that the display of the electronic device 100 is folded, bent, or unfolded to a predetermined degree, when the unfolding angle measured by the electronic device 100 is within the range of a predetermined angle. In various embodiments, the state detection sensor may include, for example, at least one of a proximity sensor, an illuminance sensor, a magnetic sensor, a hall sensor, a gesture sensor, a bending sensor, an IR sensor, and an IR camera, or a combination thereof.

Figure 6:
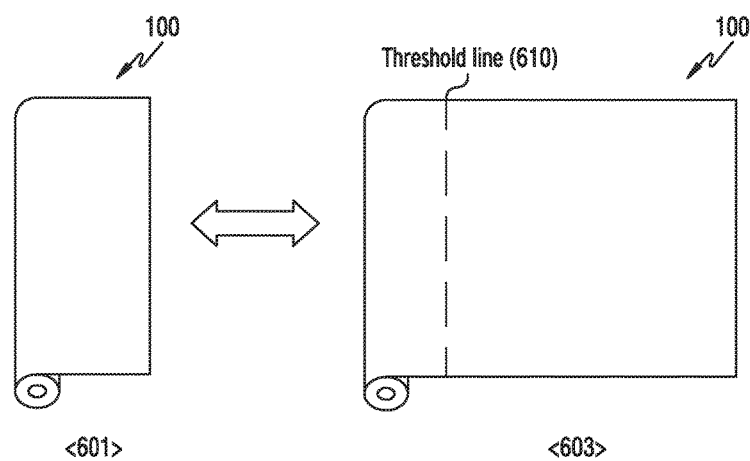
FIG. 6 is a diagram illustrating an example of changing a display form according to a display type in an electronic device according to various embodiments of the present disclosure.

FIG. 6 is a diagram illustrating an example of changing a display form according to a display type in an electronic device according to various embodiments of the present disclosure.

Referring to FIG. 6, FIG. 6 may show an example of the electronic device 100 (e.g., a rollable electronic device) including a roll-up type display (e.g., a rollable display).

According to various embodiments, when the electronic device 100 is implemented in a form of a rollable electronic device, depending on the extent of unrolling, by a user, the electronic device 100 rolled in a cylindrical form, the display 131 of the electronic device 100 may have a relatively small area exposed to the outside as in example 601, and may have a relatively large area exposed to the outside as in example 603. For example, when the display 131 of the electronic device 100 has a relatively small area exposed to the outside as in example 601 (e.g., a case of being unrolled to a set first range), the electronic device 100 may be used in a form of a bar-type phone (e.g., a folded state). For another example, when the display 131 of the electronic device 100 has a relatively large area exposed to the outside as in example 603 (e.g., a case of being unrolled to a set second range), the electronic device 100 may be used in a tablet form (e.g., an unfolded state).

According to various embodiments, the electronic device 100 may obtain information relating to the size of an area in which the display 131 of the electronic device 100 is exposed to the outside, based on a degree of unfolding curvature to which the electronic device 100 is unfolded. For example, the electronic device 100 may measure an unfolding curvature to which the electronic device 100 is unfolded, based on the state detection sensor. The electronic device 100 may predetermine a threshold curvature in order to measure a degree of an unfolding curvature, and the electronic device 100 may thus acquire the size of an area of the display 131 that is unfolded with a curvature larger than the threshold curvature. The electronic device 100 may determine whether it is being used in the form of a bar-type phone (e.g., a folded state) as shown in example 601, or to be used in a tablet form (e.g., an unfolded state) as shown in example 603, based on the acquired information relating to the size of the exposed area of the display 131.

According to various embodiments, the electronic device 100 may acquire information on the size of an area of the display 131 of the electronic device 100 that is exposed to the outside, by placing a virtual threshold line 610 on the display 131 of the electronic device 100. For example, the state detection sensor of the electronic device 100 may acquire information relating to a curvature difference between two adjacent parts located in opposite directions with reference to the threshold line 610, and may determine that the display 131 is exposed to the outside by an area exceeding the threshold line when the curvature difference has a value larger than a predetermined value. The electronic device 100 may determine whether it is being used in the form of a bar-type phone (e.g., a folded state) as shown in example 601, or to be used in a tablet form (e.g., an unfolded state) as shown in example 603, based on the acquired information relating to the size of the exposed area of the display 131.

As described above with reference to FIGS. 3 to 6, the electronic device 100 according to various embodiments may be implemented so as to include the flexible display 131 that may be folded, bent, rolled, or unfolded. For example, the electronic device 100 may be folded, bent, or unfolded based on one or more folding axes as shown in the example of FIG. 3, FIG. 4, or FIG. 5, and may be rolled into a cylindrical form or unrolled, as shown in the example of FIG. 6. The electronic device 100 may have a variety of forms depending on whether the electronic device 100 is folded, bent, rolled, or, unfolded, or the degree thereof.

Figure 7:
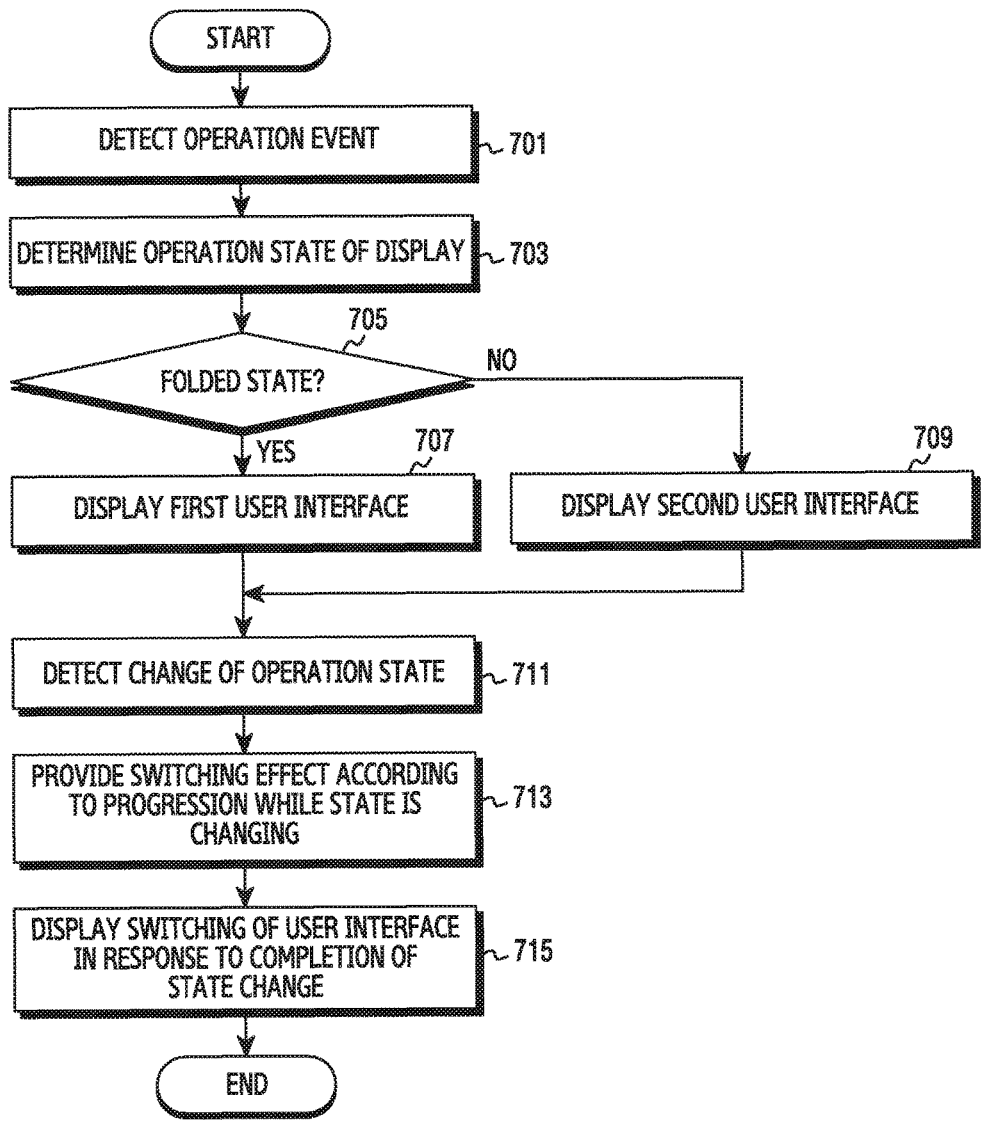
FIG. 7 is a flowchart illustrating a method of providing a UI in an electronic device according to various embodiments of the present disclosure.

FIG. 7 is a flowchart illustrating a method of providing a UI in an electronic device according to various embodiments of the present disclosure.

Referring to FIG. 7, in operation 701, the processor 180 (e.g., a processor including a processing circuit) of the electronic device 100 may detect an operation event. For example, the processor 180 may determine the operation event in response to an operation in which the display 131 is used. According to an embodiment, the operation event may include an event in which the display 131 is turned on in an off state.

In operation 703 and operation 705, the processor 180 may determine an operation state of the display 131. For example, the processor 180 may check a current state of the display 131, and determine whether the display 131 is in a folded state or an unfolded state.

When it is determined in operation 705 that the display 131 is in the folded state ("Yes" in operation 705), the processor 180 may cause a first UI to be displayed based on the display 131 in the folded state, in operation 707. For example, when it is determined that the display 131 is operating in a basic screen mode, the processor 180 may display the first UI having a home screen based on application icons. According to an embodiment, the processor 180 may provide a UI corresponding to example screen 201, as described with reference to FIG. 2.

When it is determined in operation 705 that the display 131 is in the unfolded state ("No" in operation 705), the processor 180 may cause a second UI to be displayed based on the display 131 in the unfolded state, in operation 709. For example, when it is determined that the display 131 is operating in an expanded screen mode, the processor 180 may cause the second UI having a home screen based on application icons and widgets to be displayed according to the expanded screen mode. According to an embodiment, the processor 180 may provide a UI corresponding to example screen 203 as described with reference to FIG. 2.

In operation 711, the processor 180 may detect an operation state change. For example, the processor 180 may detect a state change of the display 131 in a state where the first UI or the second UI, which correspond to the state of the display 131, is displayed. For example, a user may change the form of the display 131 by operating the electronic device 100. According to an embodiment, the user may change the state of the display 131 from the folded state to the unfolded state, or may change the state of the display 131 from the unfolded state to the folded state. The processor 180 may determine a state change event in response to a user input for changing the form of the display 131.

In operation 713, the processor 180 may provide a switching effect relating to a UI, in response to detection of a state change of the display 131. For example, while a state of the display 131 is changing, the processor 180 may provide a switching effect according to a progression of the state change.

According to an embodiment, the processor 180 may show a procedure in which, when a state of the display 131 changes from the folded state to the unfolded state, the space between icons of the first UI gradually increases (e.g., becomes wider), in other words, the size of an empty area changes (increases) according to the progression of the state change. The processor 180 may show a procedure in which widgets corresponding to respective icons gradually appear in the empty area corresponding to increase in the space between the icons. For example, the processor 180 may provide an effect in which the widgets appear according to a set switching technique (e.g., a fade-in scheme, a wipe scheme, etc.).

According to an embodiment, the processor 180 may show a procedure in which, when a state of the display 131 changes from the unfolded state to the folded state, the space between icons of the second UI gradually decreases (e.g., becomes narrower), in other words, the size of an empty area changes (decreases) according to the progression of the state change. The processor 180 may show a procedure in which the widgets gradually disappear in response to a decrease in the space between the icons. For example, the processor 180 may provide an effect in which the widgets disappear according to a fade-out scheme.

In operation 715, the processor 180 may cause the UI to be switched and displayed in response to completion of the state change. According to an embodiment, the processor 180 may switch the first UI based on the icons to the second UI based on the icons and the widgets, and then display the second UI, in response to a change from the folded state to the unfolded state. According to an embodiment, the processor 180 may switch the second UI based on the icons and the widgets to the first UI based on the icons, and then display the first UI, in response to a change from the unfolded state to the folded state.

Figure 8:
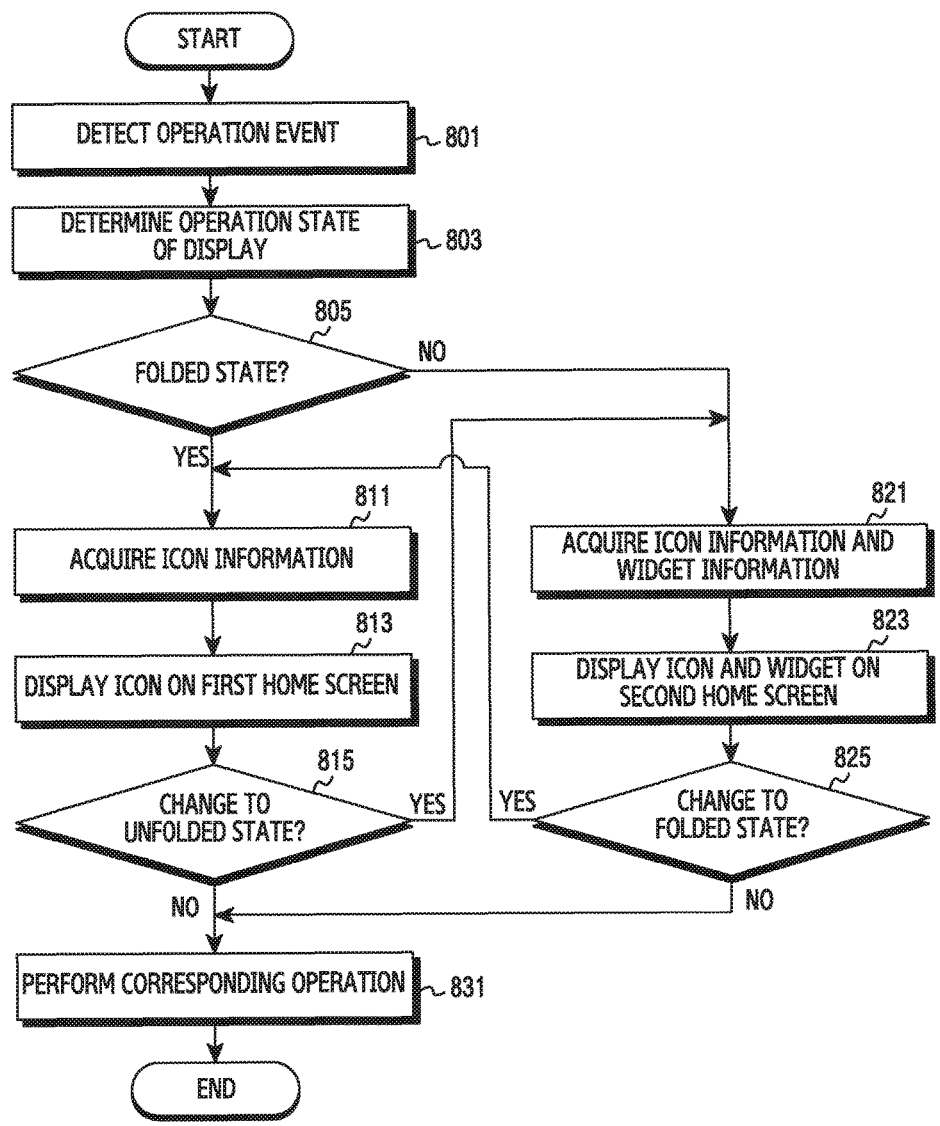
FIG. 8 is a flowchart illustrating a method of providing a UI according to a change in the form of a display in an electronic device according to various embodiments of the present disclosure.

FIG. 8 is a flowchart illustrating a method of providing a UI according to a change in the form of a display in an electronic device according to various embodiments of the present disclosure.

Referring to FIG. 8, in operation 801, the processor 180 (e.g., a processor including a processing circuit) of the electronic device 100 may detect an operation event. For example, the processor 180 may determine the operation event in response to an operation (e.g., turning on of the display 131) in which the display 131 is used.

In operation 803 and operation 805, the processor 180 may determine an operation state of the display 131. For example, the processor 180 may check a current state of the display 131, and determine whether the display 131 is in a folded state or an unfolded state.

When it is determined in operation 805 that the display 131 is in the folded state ("Yes" in operation 805), the processor 180 may acquire icon information in operation 811. According to an embodiment, the processor 180 may acquire information relating to icons set on a home screen and locations allocated to the icons. The processor 180 may further acquire information relating to a screen configuration (e.g., 4×4, 4×5, 5×5, etc.) of the home screen.

In operation 813, the processor 180 may cause icons to be displayed on a first home screen. For example, the processor 180 may cause a first UI including the first home screen configured based on the icons to be displayed.

In operation 815, the processor 180 may determine whether there is a state change in which a state of the display 131 changes from the folded state to the unfolded state.

When the state change of the display 131 is detected ("Yes" in operation 815) in operation 815, the processor 180 may proceed to operation 821, and perform operations following operation 821.

When the state change of the display 131 is not detected ("No" in operation 815) in operation 815, the processor 180 may perform a corresponding operation in operation 831. According to an embodiment, the processor 180 may control turning-off of the display 131. The processor 180 may turn off the display 131 in response to a user input for turning off the display 131 or after user input is not detected for a set time. According to an embodiment, in response to a user's selection of a specific icon on the first home screen, the processor 180 may execute an application corresponding to the selected icon and display an associated execution screen, in the folded state.

When it is determined in operation 805 that the display 131 is in the unfolded state ("No" in operation 805), the processor 180 may acquire icon information and widget information in operation 821. According to an embodiment, the processor 180 may acquire information relating to the icons, locations allocated to the icons, and widgets associated with the icons, which are set on the home screen. The processor 180 may further acquire information relating to a screen configuration (4×4, 4×5, 5×5, etc.) of the home screen.

In operation 823, the processor 180 may display the icons and the widgets on a second home screen. For example, the processor 180 may display the second UI including the second home screen configured based on the icons and the widgets.

In operation 825, the processor 180 may determine whether there is a state change in which a state of the display 131 changes from the unfolded state to the folded state.

When the state change of the display 131 is detected ("Yes" in operation 825) in operation 825, the processor 180 may proceed to operation 811, and perform operations following operation 811.

When the state change of the display 131 is not detected ("No" in operation 825) in operation 825, the processor 180 may perform a corresponding operation in operation 831. According to an embodiment, the processor 180 may process an operation associated with turning off the display 131, execution of an application corresponding to a selected icon, or execution of a function corresponding to a selected widget.

Figure 9:
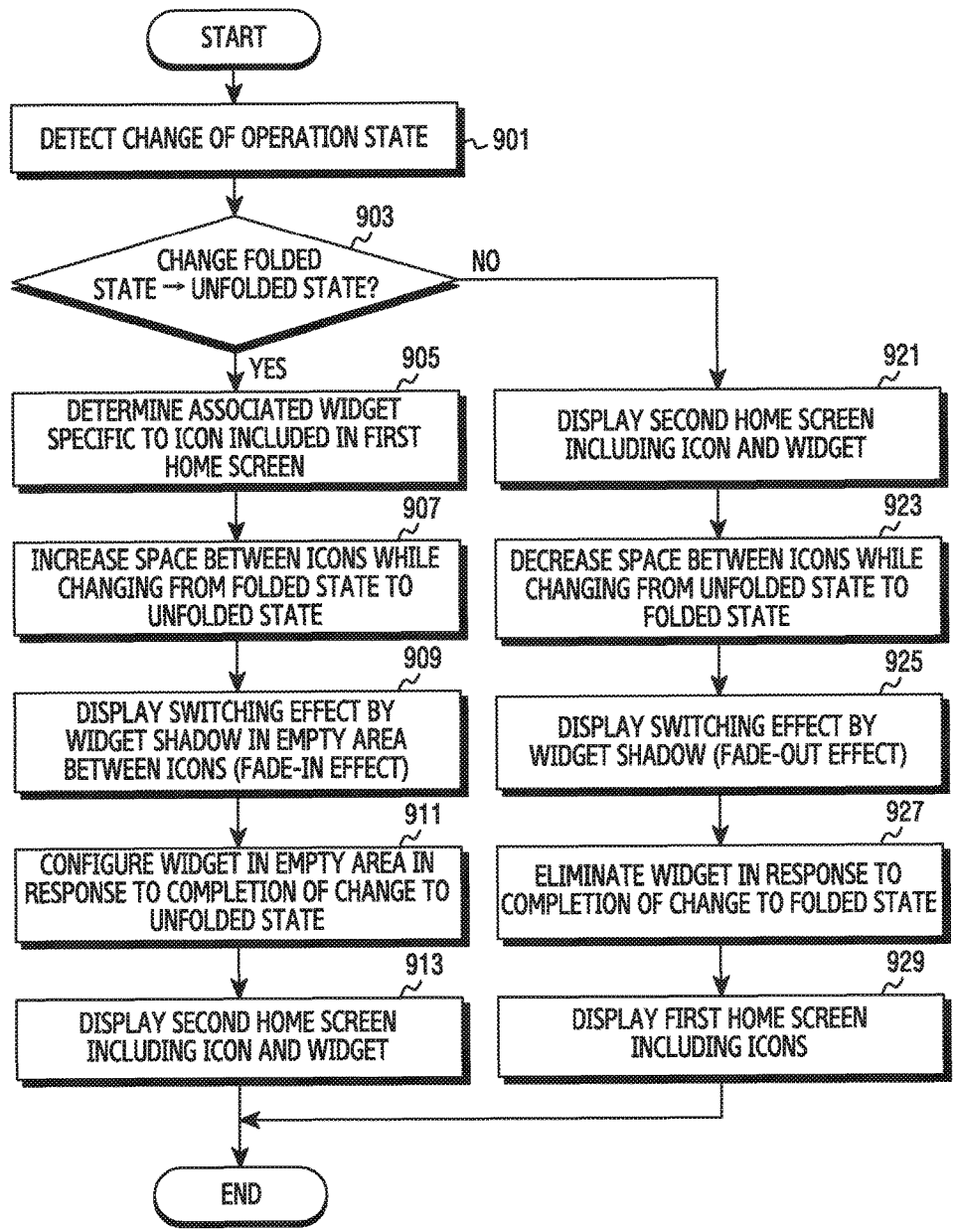
FIG. 9 is a flowchart illustrating a method of switching a UI according to a change in the form of a display in an electronic device according to various embodiments of the present disclosure.

FIG. 9 is a flowchart illustrating a method of switching a UI according to a change in the form of a display in an electronic device according to various embodiments of the present disclosure.

Referring to FIG. 9, in operation 901, the processor 180 (e.g., a processor including a processing circuit) of the electronic device 100 may detect an operation state change. For example, the processor 180 may detect a state change of the display 131 in a state where a first UI or a second UI, which corresponds to a state of the display 131, is displayed. For example, a user may change the form of the display 131 by operating the electronic device 100. According to an embodiment, the user may change the state of the display 131 from the folded state to the unfolded state, or may change from the unfolded state to the folded state. The processor 180 may determine a state change event in response to a user input for changing the form of the display 131.

In operation 903, the processor 180 may determine whether the state changes from the folded state to the unfolded state, or from the unfolded state to the folded state. For example, the processor 180 may detect a form change based on a current operation state of the display 131, and may determine a change to the unfolded state or a change to the folded state according to the current operation state (e.g., the folded state or the unfolded state).

When it is determined in operation 903 that the state changes from the folded state to the unfolded state ("Yes" in operation 903), the processor 180 may determine a widget associated with a specific icon in operation 905. According to various embodiments, the processor 180 may determine a widget associated with an icon and call the determined widget to perform buffering.

In operation 907, while the state of the display 131 is changing from the folded state to the unfolded state, the processor 180 may cause the space (e.g., a gap) between the icons included on a first home screen to be increased. According to an embodiment, the processor 180 may cause the space between the right and left icons to be increased, or may cause the space between the up and down icons to be increased, corresponding to a direction in which the display 131 is unfolded. According to an embodiment, the processor 180 may show a procedure in which, when a state of the display 131 changes from the folded state to the unfolded state, the space between the icons of the first home screen gradually increases (e.g., becomes wider), in other words, the size of an empty area changes (increases).

In operation 909, the processor 180 may cause a switching effect using a widget shadow to be displayed in an empty area between the icons. According to an embodiment, the processor 180 may show a procedure of making the widgets corresponding to the respective icons gradually appear in the empty area corresponding to the increase in the space between the icons. According to various embodiments, before an actual widget is displayed, the processor 180 may provide an effect, in which the widget appears in a fade-in scheme, using a widget shadow corresponding to the actual widget. In various embodiments, a widget shadow may indicate a virtual variable object, the size of which may be increased or decreased in a predetermined direction (e.g., in the right-left direction or the up-down direction according to the unfolding direction) for the switching effect. The widget shadow may be generated based on an image corresponding to the actual widget.

In operation 911, the processor 180 may cause a widget to be configured and displayed in an empty area in response to completion of the change to the unfolded state. For example, the processor 180 may replace the widget shadow with the widget and provide the widget when the state change of the display 131 to the fully unfolded state is completed.

In operation 913, the processor 180 may display a second home screen configured based on the icons and the widgets. An example of the second home screen is illustrated in example screen 203 of FIG. 2.

When it is determined in operation 903 that a state changes from the unfolded state to the folded state ("No" in operation 903), the processor 180 may determine the widgets included in the second screen in operation 921. For example, the processor 180 may determine the widgets displayed on the second home screen, locations thereof, and the like.

In operation 923, while the state of the display 131 is changing from the unfolded state to the folded state, the processor 180 may cause the space (e.g., a gap) between the icons included on the second home screen to be decreased. According to an embodiment, the processor 180 may cause the space between the right and left icons to be decreased, or may cause the space between the up and down icons to be decreased, corresponding to a direction in which the folding of the display 131 proceeds. According to an embodiment, the processor 180 may show a procedure in which, when a state of the display 131 changes from the unfolded state to the folded state, the space between the icons of the second home screen gradually decreases (e.g., becomes narrower), in other words, the size of an empty area changes (decreases).

In operation 925, the processor 180 may display a switching effect using a widget shadow. According to an embodiment, the processor 180 may show a procedure in which a widget between icons gradually disappears in response to a decrease in the space between the icons. According to various embodiments, the processor 180 may provide an effect in which the widget between the icons is replaced with a corresponding widget shadow, and the widget disappears in a fade-out scheme using the widget shadow.

In operation 927, the processor 180 may cause the widget between the icons to be eliminated in response to completion of the change to the folded state. For example, when the state change of the display 131 to the fully folded state is completed, the processor 180 may cause an empty area to be provided instead of displaying the widget between the icons.

In operation 929, the processor 180 may cause the first home screen configured based on the icons to be displayed. An example of the first home screen is illustrated on example screen 201 of FIG. 2.

Figure 10:
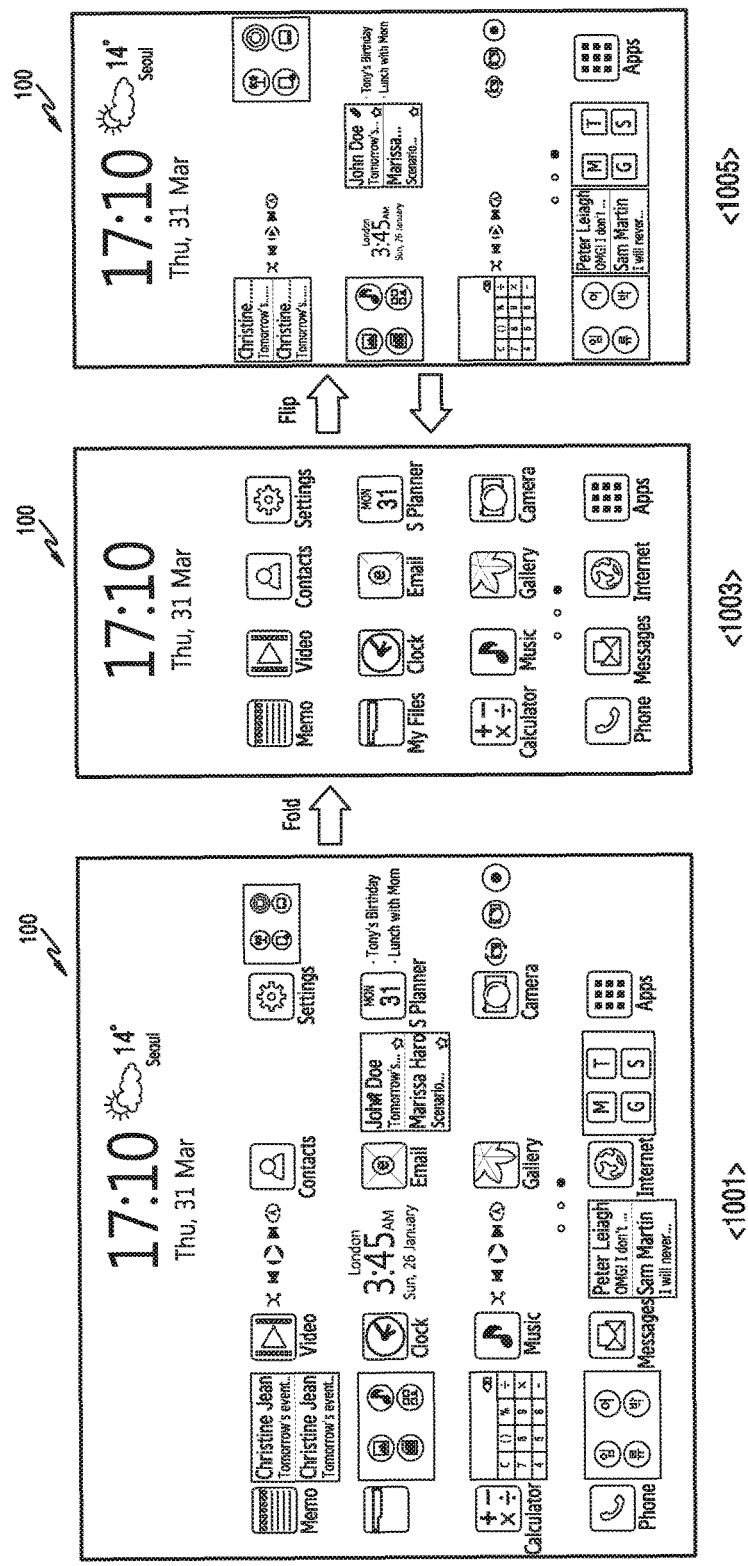
FIG. 10 is a diagram illustrating an example of providing a UI in an electronic device according to various embodiments of the present disclosure.

FIG. 10 is a diagram illustrating an example of providing a UI in an electronic device according to various embodiments of the present disclosure.

Referring to FIG. 10 and described in the description part with reference to FIG. 3, FIG. 10 may show the electronic device 100 including one folding axis and the display 131 having a form in which the display 131 (e.g., a first screen and a second screen) is folded outward so as to be exposed to the outside of the electronic device 100. For example, when a state of the electronic device 100 changes from the unfolded state to the folded state, FIG. 10 may show an example of providing a UI through a first screen and a second screen.

Referring to FIG. 10, example screen 1001 may show an example in which the electronic device 100 provides a UI (e.g., a second UI) in an expanded screen mode. For example, the electronic device 100 may display the second UI including a second screen configured based on icons and widgets.

According to various embodiments, as shown in example screen 1001, in a case of an unfolded state, the electronic device 100 may provide the second UI based on icons and widgets in the expanded screen mode using the display 131 operating as the first screen (e.g., the front screen) and the display 131 operating as the second screen (e.g., the rear screen). As shown in example screen 1003, in a case of a folded state, the electronic device 100 may provide the first UI based on icons in the basic screen mode using the first screen. As shown in example screen 1005, in a case of a folded state, the electronic device 100 may provide a third UI based on widgets in the basis screen mode using the second screen.

According to various embodiments, as shown in example screen 1001, in a state where the second UI is displayed in the expanded screen mode, the electronic device 100 may switch and provide a UI according to a change in the form of the display 131.

According to an embodiment, as illustrated in example screen 1003, when a state changes from the unfolded state to the folded state, the electronic device 100 may display a UI allocated to the first screen. For example, when a user changes a state of the electronic device 100 from the unfolded state to the folded state and uses the first screen as the front screen, the electronic device 100 may provide the first UI, including a home screen configured based on icons on the first screen, in the basic screen mode. In various embodiments, when the first screen is used, the second screen may be deactivated. For example, power may be provided to the display 131 corresponding to the first screen to enable display and input, and power to the display 131 corresponding to the second screen may be blocked to prevent display and input from being performed.

According to an embodiment, as illustrated in example screen 1005, when a state changes from the unfolded state to the folded state, the electronic device 100 may display a UI allocated to the second screen. For example, when a user changes a state of the electronic device 100 from the unfolded state to the folded state and uses the second screen as the rear screen, the electronic device 100 may provide the second UI including a home screen configured based on widgets on the second screen in the basic screen mode. In various embodiments, the widgets provided on the second screen may be widgets associated with the icons provided on the first screen. In various embodiments, when the second screen is used, the first screen may be deactivated. For example, power may be supplied to the display 131 corresponding to the second screen to enable display and input, and power to the display 131 corresponding to the first screen may be blocked to prevent display and input from being performed.

According to various embodiments, a user may switch from the screen shown in example screen 1003 to the screen shown in example screen 1005. For example, while using one screen (e.g., the first screen or the second screen) of the electronic device 100, the user may flip the electronic device 100 to use the other screen (e.g., the second screen or the first screen) of the electronic device 100. In the folded state, while performing display based on the basic screen mode through one screen, when the electronic device 100 detects flipping thereof, the display may be performed based on the basic screen mode through the other screen.

According to an embodiment, while displaying the first UI based on the icons through the first screen (e.g., the front screen), the electronic device 100 may display the third UI based on the widgets through the second screen (e.g., the rear screen) in response to the flipping of the electronic device 100. Here, the electronic device 100 may deactivate the first screen which is not in use according to the flipping.

According to an embodiment, while displaying the third UI based on the widgets through the second screen (e.g., the rear screen), the electronic device 100 may display the first UI based on the icons through the first screen (e.g., the front screen) in response to the flipping of the electronic device 100. Here, the electronic device 100 may deactivate the second screen which is not in use due to the flipping.

Figure 11:
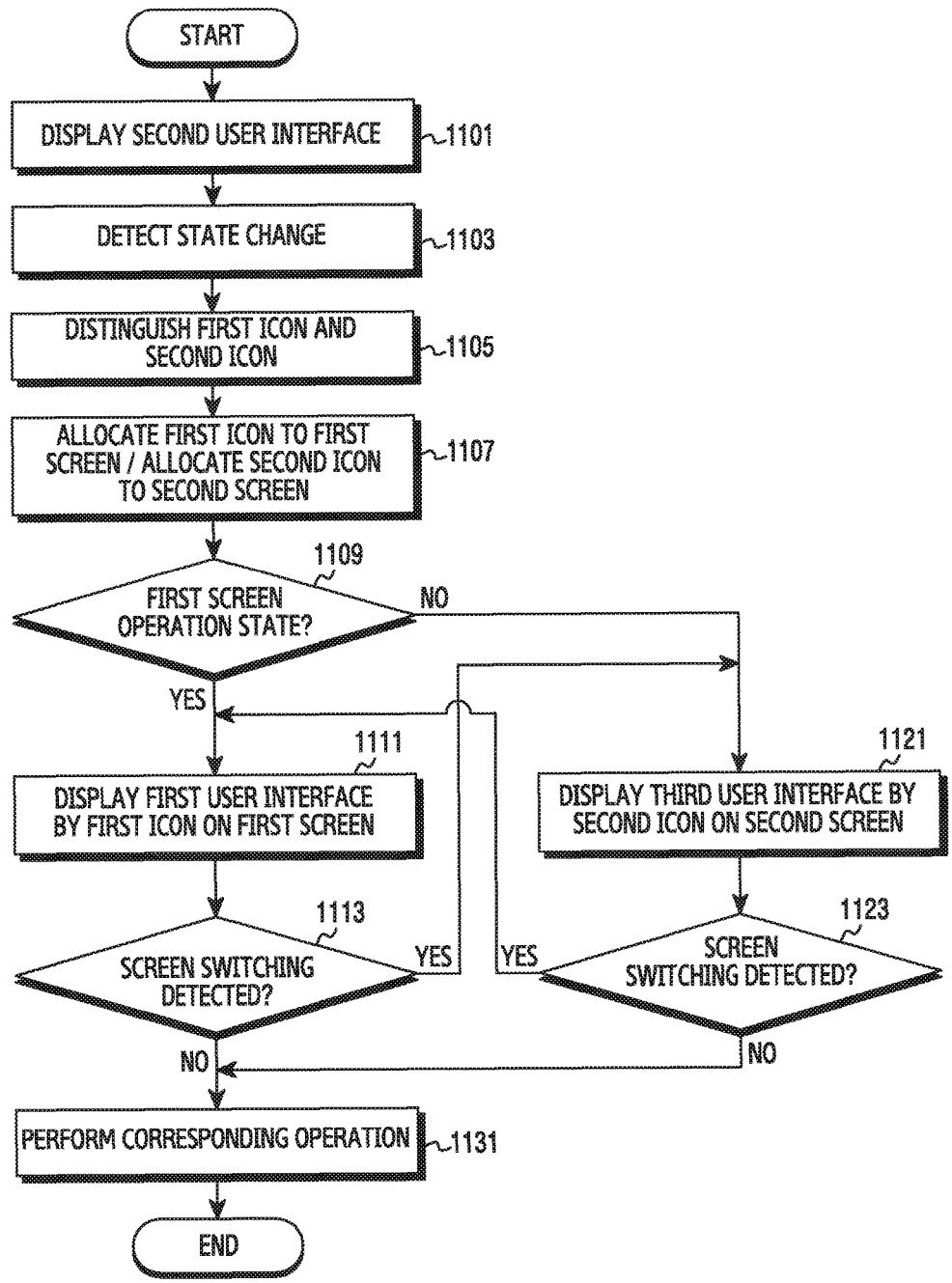
FIG. 11 is a flowchart illustrating a method of providing a UI in an electronic device according to various embodiments of the present disclosure.

FIG. 11 is a flowchart illustrating a method of providing a UI in an electronic device according to various embodiments of the present disclosure.

Referring to FIG. 11, in operation 1101, the processor 180 (e.g., a processor) of the electronic device 100 may be in a state of displaying the second UI. For example, the electronic device 100 may be in the unfolded state, and may be operating in the extended screen mode. The processor 180 may display the second UI based on first icons (e.g., application icons) and second icons (e.g., widgets) in the unfolded state.

In operation 1103, the processor 180 may detect a state change of the display 131. For example, the processor 180 may detect that a state of the display 131 changes from the unfolded state to the folded state.

In operation 1105, the processor 180 may distinguish the first icons and the second icons of the second UI. For example, the processor 180 may identify the icons included in the second UI, and may distinguish application icons and widgets.

In operation 1107, the processor 180 may allocate (set) the first icons to be displayed through the first screen, and may allocate (set) the second icons to be displayed through the second screen. In various embodiments, operation 1105 and operation 1107 may be configured and managed in advance, and an operation associated therewith may not be performed in FIG. 11. For example, in FIG. 11, operation 1109 may be performed immediately after operation 1101.

In operation 1109, the processor 180 may determine whether the display 131 of the electronic device 100 corresponds to an operation state of the first screen or to an operation state of the second screen. For example, the processor 180 may determine whether the first screen (e.g., the front screen) of the electronic device 100 is in an available state, or whether the second screen (e.g., the rear screen) of the electronic device 100 is in an available state.

When it is determined in operation 1109 that a state is a first screen operation state ("Yes" in operation 1109), the first UI having the first icons may be displayed on the first screen in operation 1111. For example, when the electronic device 100 operates in the basic screen mode in the folded state, the processor 180 may display the first UI including application icons on the first screen.

In operation 1113, the processor 180 may determine whether screen switching is detected. For example, the processor 180 may detect flipping of the electronic device 100 while displaying the first UI based on the first icons through the first screen.

In operation 1113, when screen switching is detected ("Yes" in operation 1113), the processor 180 may proceed to operation 1121 and perform operations subsequent to operation 1121.

In operation 1113, when screen switching is not detected ("No" in operation 1113), the processor 180 may perform a corresponding operation in operation 1131. According to an embodiment, the processor 180 may control turning-off of the display 131. The processor 180 may turn off the display 131 in response to a user input for turning off the display 131 or after user input is not detected for a set time. According to an embodiment, in response to a user's selection of a specific icon on the first home screen, the processor 180 may execute an application corresponding to the selected icon and display an associated execution screen, in the folded state. According to an embodiment, the processor 180 may process an operation associated with switching to and providing the second UI in response to a state change from the folded state to the unfolded state.

When it is determined in operation 1109 that a state is a second screen operation state ("No" in operation 1109), the processor 180 may display the third UI having the second icons on the second screen in operation 1121. For example, when the electronic device 100 operates in the basic screen mode in a folded state, the processor 180 may display the third UI including the widgets on the second screen.

In operation 1123, the processor 180 may determine whether screen switching is detected. For example, the processor 180 may detect flipping of the electronic device 100 while displaying the third UI based on the second icons through the second screen.

When screen switching is not detected ("No" in operation 1113) in operation 1123, the processor 180 may perform a corresponding operation in operation 1131. According to an embodiment, the processor 180 may process an operation associated with controlling turning-off of the display 131, execution of a specific widget selected from the second home screen, or switching to and displaying the second UI in response to a state change from the folded state to the unfolded state.

Figure 12:
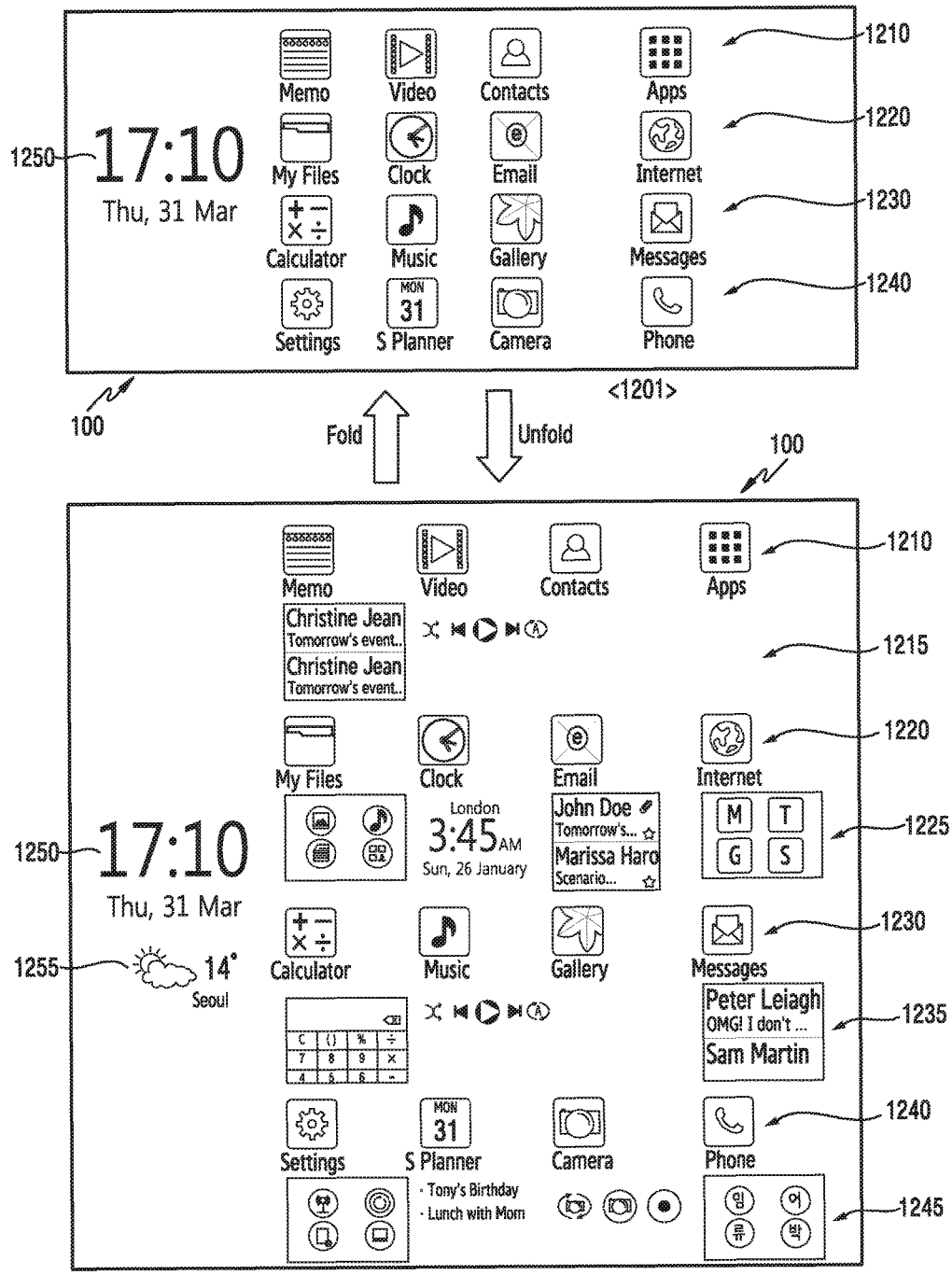
FIG. 12 is a diagram illustrating an example of providing a UI in an electronic device according to various embodiments of the present disclosure.

FIG. 12 is a diagram illustrating an example of providing a UI in an electronic device according to various embodiments of the present disclosure.

Referring to FIG. 12, example screen 1201 may show an example of a UI (hereinafter, referred to as a first UI) provided in a case where the electronic device 100 operates based on a basic screen mode in a horizontal operation mode (e.g., a horizontal mode). For example, example screen 1201 may show a case where the form of the display 131 of the electronic device 100 is a folded form (or a basic form, or a shrunk form). Example screen 1203 may show an example of a UI (hereinafter, referred to as a second UI) provided in a case where the electronic device 100 operates based on an expanded screen mode in the horizontal operation mode (e.g., a horizontal mode). For example, example screen 1203 may show a case where the form of the display 131 of the electronic device 100 is an unfolded form (or an expanded form).

As illustrated in example screen 1202, the first UI may provide a home screen (hereinafter, a first home screen) corresponding to a user's setting. According to an embodiment, the electronic device 100 may have one or more applications installed therein, and may provide application icons 1210, 1220, 1230, 1240, and 1250 capable of executing the applications through a home screen operating in a vertical direction. In various embodiments, unlike other application ions 1210, 1220, 1230, and 1240, the application icon 1250 may be an application (e.g., a clock application) pre-set by the electronic device 100, and may have, for example, an independent arrangement (e.g., arranged in the middle of a first column, or the center of a first row). According to various embodiments, the application icon 1250 may not be included in the home screen, or may be included in the home screen in an arrangement the same as or similar to that of the other application icons 1210, 1220, 1230, and 1240. Hereinafter, it is assumed that the application icon 1250 is not included in a basic arrangement but is set to an independent arrangement (for example, a fixed position).

In various embodiments, the application icons 1210, 1220, 1230, 1240, and 1250 may be trigger objects for executing corresponding applications (or functions) to display an execution screen associated with each of the applications through the display 131.

According to various embodiments, the first home screen may have at least one page and various screen configurations (or arrangements) (e.g., 4×4, 4×5, and 5×5) corresponding to a horizontal operation mode (e.g., a horizontal mode) according to a user's setting. According to an embodiment, illustrating, for example, a 4×4 screen configuration, when the number of application icons 1210, 1220, 1230, and 1240 exceeds 16, excess application icons (not shown) may be placed on the next page. The arrangement positions of the application icons 1210, 1220, 1230, 1240 and 1250 may be variously implemented according to a setting of the electronic device 100.

As illustrated in example screen 1203, the second UI may provide a home screen (hereinafter, referred to as a second home screen) different from the first home screen. According to an embodiment, the electronic device 100 may install, in addition to applications, mini applications (herein, referred to as a widget) 1215, 1225, 1235, 1245, and 1255 which are associated with or independent of the applications.

In various embodiments, the widgets 1215, 1225, 1235, 1245, and 1255 may be, for example, mini applications that enable direct use and/or checking of various functions (e.g., a weather function, a calendar function, a calculator function, a memo function, a mail function, a clock function, etc.) and various information (e.g., information on weather, games, stock quotes, mail, news, SNS, messages, etc.), without going through an application (e.g., a web browser) in the electronic device 100. For example, the widgets 1215, 1225, 1235, 1245, and 1255 are small-sized applications containing various functions, such as a weather function, a calculator function, a clock function, etc., and various information (e.g., contents), and a user may directly use or check various related services through the widgets 1215, 1225, 1235, 1245, and 1255 without launching full applications.

In various embodiments, the second home screen may include a form that is a vertically expanded form of the first home screen. According to various embodiments, the second home screen may include first icons (first objects, or application icons) 1210, 1220, 1230, 1240, and 1250 of the first home screen and second icons (widgets) 1215, 1225, 1235, 1245, and 1255 associated with applications corresponding to the first icons 1210, 1220, 1230, 1240, and 1250. According to an embodiment, the second icons 1215, 1225, 1235, 1245, and 1255 may be provided in areas adjacent to respectively corresponding first icons 1210, 1220, 1230, 1240, and 1250. For example, the second icons 1215, 1225, 1235, 1245, and 1255 may be provided adjacent to one side (e.g., the lower side, in FIG. 12) of the corresponding first icons 1210, 1220, 1230, 1240 and 1250, respectively.

According to an embodiment, when the display 131 is unfolded (e.g., screen expansion in a vertical direction) in a horizontal operation mode (e.g., a horizontal mode), for example, when the display 131 changes in a manner of changing from example screen 1201 to example screen 1203, the width of a space (or gap) between the first icons 1210, 1220, 1230, 1240, and 1250 may increase. For example, the space between the first icons 1210, 1220, 1230, 1240, and 1250 may increase in a vertical direction by an amount corresponding to the extent to which the screen is expanded in a vertical direction. Here, a reference row may be an icon group 1210 of the uppermost row of example screen 1201, and empty areas may be generated between the upper and lower icons by shifting icons 1220, 1230, and 1240 in the lower side of the icon group 1210 of the reference row to the lower side by a set space. According to an embodiment, the first icon 1250 may have an empty area generated in the lower side thereof in response to an increase in the space between the other first icons 1210, 1220, 1230, and 1240. According to an embodiment, the space (e.g., gap) between the first icons 1210, 1220, 1230, 1240, and 1250 may be increased or decreased at an identical ratio starting from the reference row (e.g., the icon group 1210). According to an embodiment, when it is assumed that the space the gap between icons in a Y-axis direction) between icons in example screen 1201 is "N", the space (e.g., the gap between icons in a Y-axis direction) between icons in example screen 1203 may have a value larger than N, for example, N×2, N×2.5, or the like.

According to various embodiments, the electronic device 100 may switch between the first UI and the second UI in real time and provide the switched UI according to a change in the form of the display 131.

According to an embodiment, when the display 131 is switched from the basic screen mode to the expanded screen mode (e.g., from a folded state to an unfolded state), the electronic device 100 may switch the first UI based on the first icons 1210, 1220, 1230, 1240, and 1250 to the second UI based on the first icons 1210, 1220, 1230, 1240, and 1250 and the second icons 1215, 1225, 1235, 1245, and 1255, and then display the second UI. According to an embodiment, when the display 131 is switched from the expanded screen mode to the basic screen mode (e.g., from an unfolded state to a folded state), the electronic device 100 may switch the second UI based on the first icons 1210, 1220, 1230, 1240, and 1250 and the second icons 1215, 1225, 1235, 1245, and 1255 to the first UI based on the first icons 1210, 1220, 1230, 1240, and 1250, and then display the first UI. According to various embodiments, the electronic device 100 may switch and provide, in real time, the home screen based on icons or the home screen based on icons and widgets by refreshing the home screen, in response to a change in the form of the display 131 (e.g., from a folded form to an unfolded form, or from an unfolded form to a folded form).

According to various embodiments, the second icons (e.g., widgets) may be provided as the widgets 1215, 1225, 1235, 1245, and 1255 associated with the application icons 1210, 1220, 1230 1240, and 1250, which are located in the left side, the right side, the upper side, or the lower side, according to a direction in which the display 131 is expanded. For example, the widgets 1215, 1225, 1235, and 1245 may be displayed by calling the widgets 1215, 1225, 1235, 1245, and 1255 associated with target application icons 1210, 1220, 1230, 1240, and 1250, in empty areas between the application icons 1210, 1220, 1230, 1240, and 1250, the spaces between which are increased in the direction in which the display 131 is expanded.

In the example of FIG. 12, the display 131 is expanded in the lower direction and widgets associated with icons are set to the lower side of the icons, but embodiments may vary, and the present disclosure is not limited thereto. For example, as described with reference to FIG. 2, widgets may be displayed in association with corresponding icons in the right side empty area, the left side empty area, the lower side empty area, or the upper side empty area of the corresponding icons, corresponding to a direction in which the display 131 expands. For example, the electronic device 100 may display widgets 1215, 1225, 1235, and 1245, associated with icons 1210, 1220, 1230, and 1240 to be adjacent to the right side, the left side, the upper side, or the lower side of corresponding icons 1210, 1220, 1230, and 1240, according to an expansion direction of the display 131.

Figure 13:
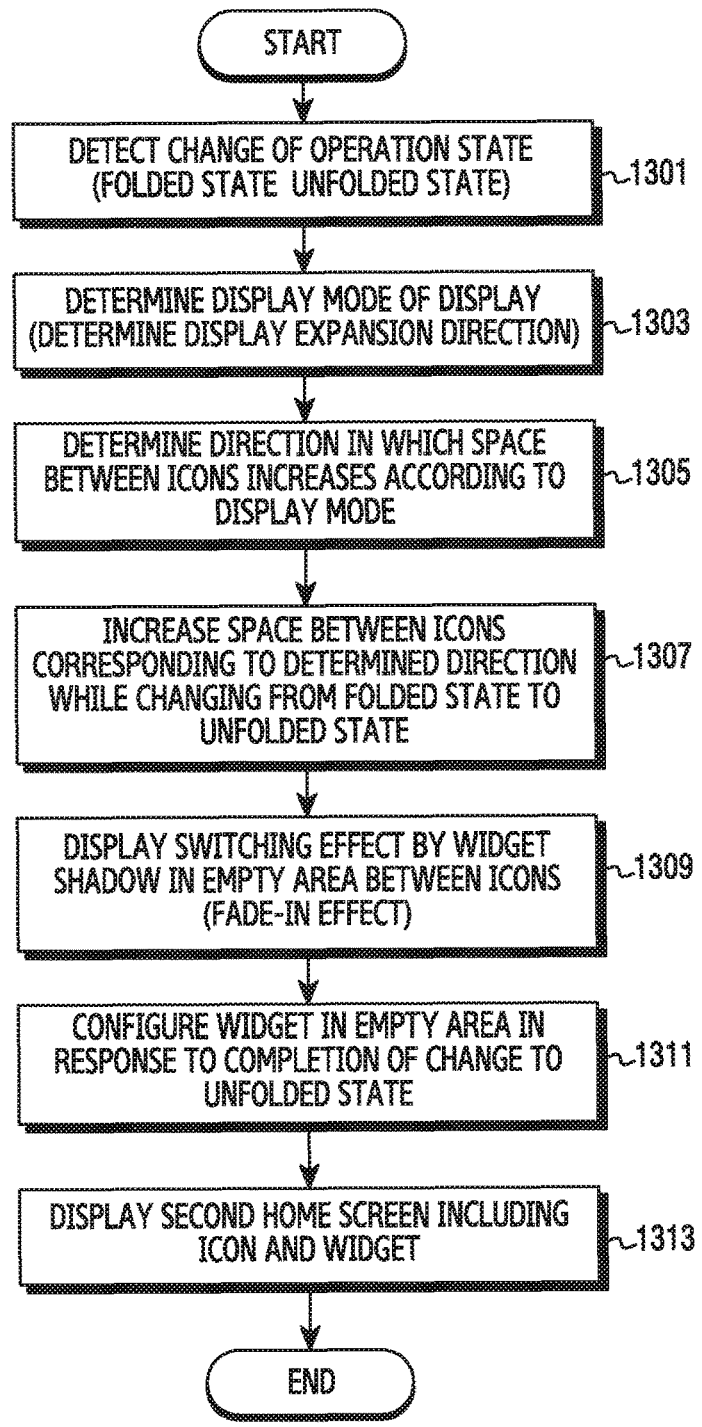
FIG. 13 is a flowchart illustrating a method of providing a UI in an electronic device according to various embodiments of the present disclosure.

FIG. 13 is a flowchart illustrating a method of providing a UI in an electronic device according to various embodiments of the present disclosure.

Referring to FIG. 13, in operation 1301, the processor 180 (e.g., a processor including a processing circuit) of the electronic device 100 may detect an operation state change. For example, the processor 180 may detect a state change of the display 131 in a state where a first UI or a second UI, which corresponds to a state of the display 131, is displayed.

According to an embodiment, FIG. 13 shows an example in which the form of the display 131 changes from the folded state to the unfolded state.

In operation 1303, the processor 180 may determine a display mode of the display 131. For example, the processor 180 may determine an expansion direction of the display 131. In various embodiments, the processor 180 may determine an expansion direction based on an operation mode (e.g., a vertical mode or a horizontal mode) of the electronic device 100. According to an embodiment, the processor 180 may determine whether the display 131 expands from the vertical mode of the electronic device 100 to the horizontal mode the electronic device 100, or whether the display 131 expands from the horizontal mode of the electronic device 100 to the vertical mode of the electronic device 100.

In operation 1305, the processor 180 may determine a direction in which the space (e.g., a gap) between the icons increases, according to determination on a display mode in operation 1303. According to an embodiment, when the display 131 expands to the right side in a horizontal direction, the processor 180 may determine a direction, in which the space between the icons increases, to be the right side. According to an embodiment, when the display 131 expands to the lower side in a vertical direction, the processor 180 determine a direction, in which the space between the icons increases, to be the lower side.

In operation 1307, while a state of the display 131 is changing, the processor 180 may increase the space between the icons corresponding to a determined direction and display the same. According to an embodiment, the processor 180 may show a procedure in which, when a state of the display 131 changes from the folded state to the unfolded state, the space between icons of the first UI gradually increases (e.g., becomes wider), in other words, the size of an empty area changes (increases) according to the progression of the state change. According to an embodiment, the processor 180 may cause the space between the right and left icons to be increased, or may cause the space between the up and down icons to be increased, corresponding to a direction in which the unfolding of the display 131 proceeds.

In operation 1309, the processor 180 may cause a switching effect using a widget shadow to be displayed in an empty area between the icons. According to an embodiment, the processor 180 may show a procedure of making the widgets corresponding to the respective icons gradually appear in the empty area corresponding to the increase in the space between the icons. According to various embodiments, before an actual widget is displayed, the processor 180 may provide an effect, in which the widget appears in a fade-in scheme, by using a widget shadow corresponding to the actual widget. In various embodiments, a widget shadow may indicate a virtual variable object, the size of which may be increased or decreased in a predetermined direction (e.g., in the right-left direction or the up-down direction according to the unfolding direction) for the switching effect.

In operation 1311, the processor 180 may cause a widget to be configured and displayed in an empty area in response to completion of the change to the unfolded state. For example, the processor 180 may replace the widget shadow with the widget and provide the widget when the state change of the display 131 to the fully unfolded state is completed.

In operation 1313, the processor 180 may display the second UI configured based on the icons and the widgets. An example of the second UI is illustrated in example screen 203 in FIG. 2 and example screen 1203 in FIG. 12.

Figure 14:
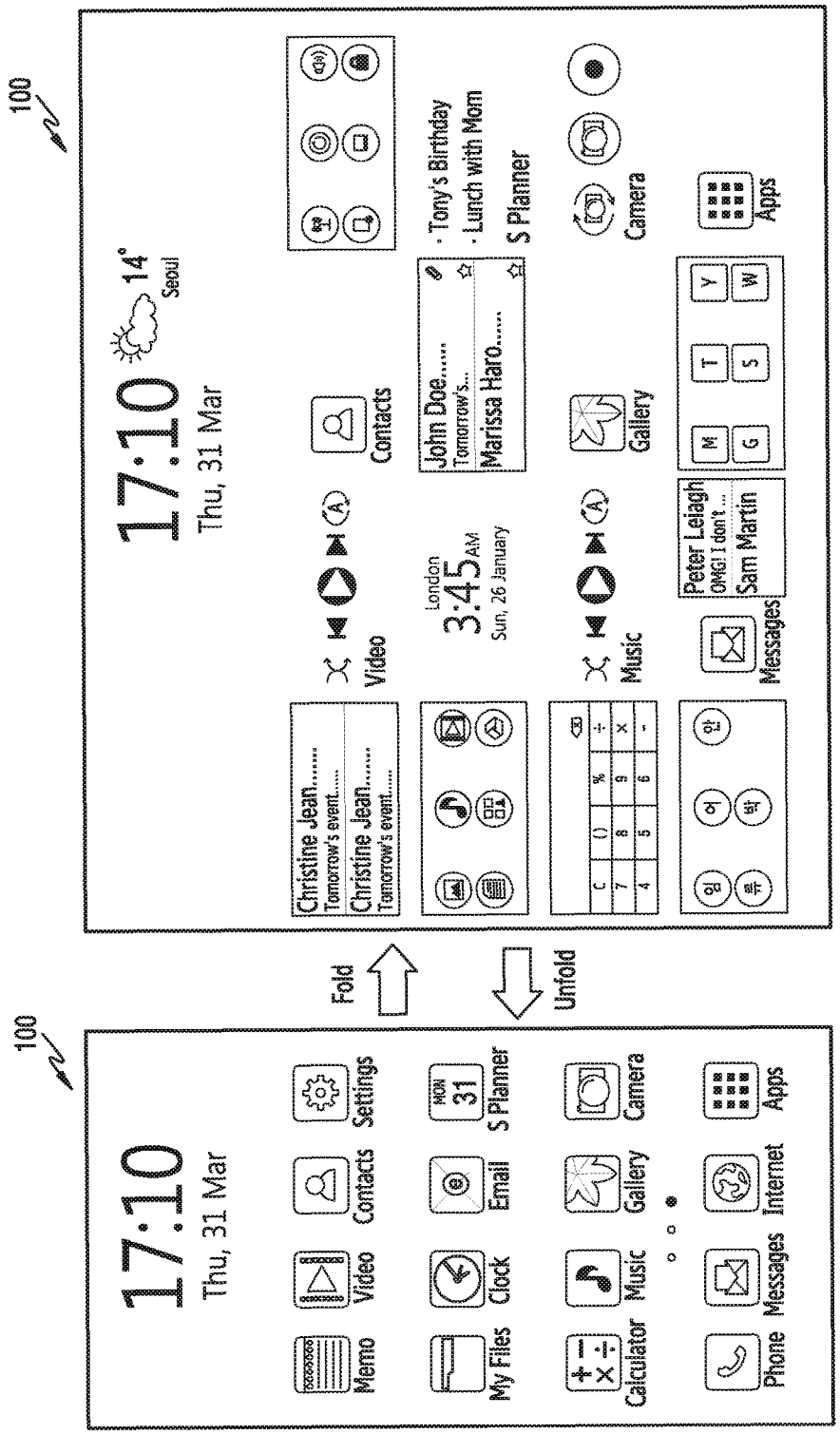
FIG. 14 is a diagram illustrating an example of providing a UI in an electronic device according to various embodiments of the present disclosure.

FIG. 14 is a diagram illustrating an example of providing a UI in an electronic device according to various embodiments of the present disclosure.

Referring to FIG. 14, example screen 1401 may show an example of a UI (hereinafter, referred to as a first UI) provided when the electronic device 100 operates in the basic screen mode. For example, example screen 1401 may show a case where the form of the display 131 of the electronic device 100 is a folded form. Example screen 1403 may show an example of a UI (hereinafter, referred to as a fourth UI) provided when the electronic device 100 operates in the expanded screen mode. For example, example screen 1403 may show a case where the form of the display 131 of the electronic device 100 is an unfolded form.

As illustrated in example screen 1403, the fourth UI may provide a home screen (hereinafter, a fourth home screen) different from the first UI. According to various embodiments, the fourth home screen may be configured based on widgets associated with applications corresponding to the icons on the first home screen. According to an embodiment, the widgets may be provided in locations corresponding to the respective icons. According to an embodiment, the widgets of the fourth home screen may be configured according to arrangement information displayed in locations corresponding to the icons of the first home screen. According to various embodiments, when there is no widget associated with the icons, an empty area may be provided at a location matching a corresponding icon on the fourth home screen.

According to various embodiments, when the display 131 changes in a manner of changing from example screen 1401 to example screen 1403, the icons disappear and widgets associated with the respective icons may appear in corresponding locations.

According to various embodiments, the electronic device 100 may display the first UI or the fourth UI, as described above, according to the changing form of the display 131.

According to various embodiments, the electronic device 100 may provide the home screen using different UIs, such as the first UI or the fourth UI, according to a change in the form of the display 131, such as folding or unfolding of the display 131. According to an embodiment, the first UI may include a home screen configured based on application objects (e.g., first icons, i.e., application icons) set by a user, in the basic screen mode (e.g., a folded state) of the display 131. According to an embodiment, the fourth UI may include a home screen configured based on mini application objects (e.g., second icons, i.e., widgets) associated with the first icons, in the expanded screen mode (e.g., the unfolded state) of the display 131.

According to various embodiments, the electronic device 100 may switch and provide the first UI and the fourth UI in real time according to a change in the form of the display 131.

According to an embodiment, when the display 131 is switched from the basic screen mode to the expanded screen mode (e.g., from a folded state to an unfolded state), the electronic device 100 may switch the first UI based on the first icons to the fourth UI based on the second icons, and then display the fourth UI. According to an embodiment, when the display 131 is switched from the expanded screen mode to the basic screen mode (e.g., from an unfolded state to a folded state), the electronic device 100 may switch the fourth UI based on the second icons to the first UI based on the first icons.

According to an embodiment, when the display 131 is expanded in the right direction, widgets associated with the icons of the first UI may be called, and the called widgets may be configured to be arranged corresponding to the icon arrangement of the first UI, thereby providing the fourth UI.

Figure 15:
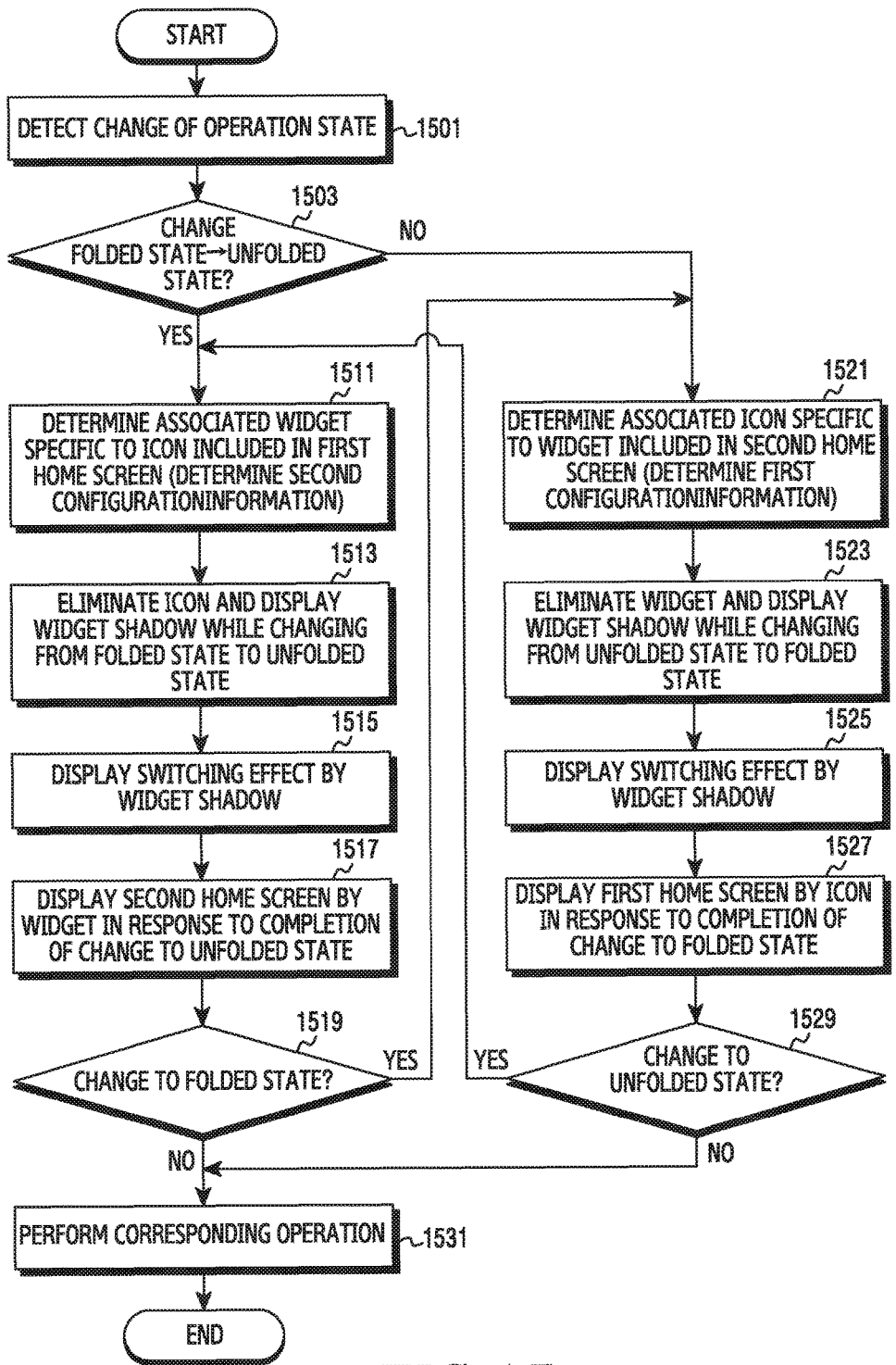
FIG. 15 is a diagram illustrating a method of providing a UI in an electronic device according to various embodiments of the present disclosure.

FIG. 15 is a diagram illustrating a method of providing a UI in an electronic device according to various embodiments of the present disclosure.

Referring to FIG. 15, in operation 1501, the processor 180 (e.g., a processor) of the electronic device 100 may detect an operation state change. For example, a user may change the form of the display 131 by operating the electronic device 100. According to an embodiment, the user may change a state of the display 131 from a folded state to an unfolded state, or from an unfolded state to a folded state. The processor 180 may determine a state change event in response to a user input for changing the form of the display 131.

In operation 1503, the processor 180 may determine whether a state change occurs from a folded state to an unfolded state or from an unfolded state to a folded state. For example, the processor 180 may detect a form change based on a current operation state, and may determine a change of an unfolded state or a change of a folded state according to a change in a current operation state (e.g., a folded state or an unfolded state) of the display 131.

When it is determined in operation 1503 that a state changes from a folded state to an unfolded state ("Yes" in operation 1503), the processor 180 may determine, in operation 1511, widgets corresponding to icons included in a first home screen. For example, the processor 180 may identify icons on the first home screen of the first UI, and may determine widgets associated with the identified icons. For example, the processor 180 may distinguish widgets associated with icons of the first home screen based on preset second configuration information for configuring a second home screen of the second UI.

In operation 1513, while the state of the display 131 is changing from the folded state to the unfolded state, the processor 180 may eliminate the icons included in the first home screen and display widget shadows. According to various embodiments, when a state of the display 131 changes from the folded state to the unfolded state, the processor 180 may cause the icons of the first home screen to gradually disappear according to progression of the state change, and may cause the widget shadows to gradually appear at locations corresponding to the icons.

In operation 1515, the processor 180 may display a switching effect using the widget shadows. According to an embodiment, while the state of the display 131 is changing from the folded state to the unfolded state, the processor 180 may show a procedure in which the icons gradually disappear as the widgets gradually appear at locations corresponding to the icons. According to various embodiments, before an actual widget is displayed, the processor 180 may provide an effect, in which the widget appears in a fade-in scheme, using a widget shadow corresponding to the actual widget.

In operation 1517, the processor 180 may cause the second home screen configured based on the widgets to be displayed in response to completion of the change to the unfolded state. For example, the processor 180 may replace the widget shadow with the widget and provide the widget when the state change of the display 131 to the fully unfolded state is completed. An example thereof is illustrated in example screen 1403 of FIG. 14.

In operation 1519, the processor 180 may determine whether there is a state change of the display 131 from the unfolded state to the folded state.

When the state change of the display 131 is detected ("Yes" in operation 1519) in operation 1519, the processor 180 may proceed to operation 1521 and perform operations subsequent to operation 1521.

When the state change of the display 131 is not detected ("No" in operation 1519) in operation 1519, the processor 180 may perform a corresponding operation in operation 1531. According to an embodiment, the processor 180 may process an operation associated with turning off the display 131 or performing a function corresponding to a selected widget.

When it is determined in operation 1503 that a state changes from the unfolded state to the folded state ("No" in operation 1503), the processor 180 may determine, in operation 1521, the icons corresponding to the widgets included in the second home screen. For example, the processor 180 may identify the widgets in the second home screen of the second UI, and may determine the icons associated with the identified widgets. According to an embodiment, in relation to an empty area having no widget therein, the processor 180 may identify an icon mapped to the empty area. According to an embodiment, when a captured image, instead of an empty area, exists at a location at which a widget is provided, the processor 180 may identify an icon mapped to the capture image. For example, the processor 180 may distinguish an icon associated with a widget, an empty area, or a captured image of the second home screen based on preset first configuration information for configuring the first home screen of the first UI.

In operation 1523, while a state of the display 131 is changing from the unfolded state to the folded state, the processor 180 may eliminate the widgets included in the second home screen and display widget shadows. According to various embodiments, when a state of the display 131 changes from the unfolded state to the folded state, the processor 180 may cause the widgets of the second home screen to gradually disappear according to progression of the state change, and may cause the widget shadows to gradually appear at locations corresponding to the widgets (e.g., including an empty area).

In operation 1525, the processor 180 may display a switching effect using the widget shadows. According to an embodiment, while a state of the display 131 changes from the unfolded state to the folded state, the processor 180 may show a procedure in which the widgets gradually disappear as the icons gradually appear at locations corresponding to the widgets (e.g., including an empty area). According to various embodiments, the processor 180 may provide an effect in which the widgets disappear in a fade-out scheme using the widget shadows.

In operation 1527, the processor 180 may cause the first home screen configured based on the icons to be displayed in response to completion of the change to the folded state. For example, when the state change of the display 131 to the fully folded state is completed, the processor 180 may replace the widget shadows with the icons to provide the icons. An example thereof is illustrated in example screen 1401 of FIG. 14.

In operation 1529, the processor 180 may determine whether there is a state change in which a state of the display 131 changes from the folded state to the unfolded state.

When the state change of the display 131 is detected ("Yes" in operation 1529) in operation 1529, the processor 180 may proceed to operation 1511 and perform operations subsequent to operation 1511.

When the state change of the display 131 is not detected ("No" in operation 1529) in operation 1529, the processor 180 may perform a corresponding operation in operation 1531. According to an embodiment, the processor 180 may process an operation associated with turning off the display 131 or performing a function corresponding to a selected icon.

As described above, an operation method of an electronic device according to various embodiments may include: determining an operation state of a display; displaying a first UI based on a first object according to a basic arrangement when the operation state is a first state; and displaying a second UI based on the first object and a second object associated with the first object according to an expanded arrangement when the operation state is a second state, in which the second object may be displayed in an area adjacent to the first object, corresponding to the expanded arrangement.

According to various embodiments, the first object may include an application icon, and the second object may include a mini application associated with the first object.

According to various embodiments, determining of the operation state may include determining the operation state of the display in response to an operation in which the display is used.

According to various embodiments, the operation method of the electronic device may further include: detecting a state change in which the form of the display changes; increasing the size of an empty area between first objects when the state change occurs from the first state to the second state; and displaying the second object in the empty area.

According to various embodiments, displaying of the second object may include displaying a switching effect using a widget shadow through the empty area between the first objects, corresponding to a direction in which a state change proceeds, when the state change occurs from the first state to the second state.

According to various embodiments, the operation method of the electronic device may further include: detecting a state change in which the form of the display changes; decreasing the size of an empty area between first objects when the state change occurs from the second state to the first state; and discontinuing the display of the second object.

According to various embodiments, displaying of the first UI may include allocating the first object on a first screen of the display and allocating the second object on a second screen of the display, when a state change occurs from the second state to the first state.

According to various embodiments, the operation method of the electronic device may further include: displaying the first object when the display is used based on the first screen; and displaying the second object when the display is used based on the second screen, in which the first screen and the second screen are switched in response to flipping of the electronic device, and one of the first screen and the second screen, which is not in use, is deactivated.

According to various embodiments, displaying of the second UI may include providing an empty area in the second UI when a second object associated with the first object does not exist.

According to various embodiments, displaying of the second UI may include providing a captured image obtained by capturing the last execution screen of an application corresponding to the first object when a second object associated with the first object does not exist.

According to various embodiments, the operation method of the electronic device may further include displaying a third UI based on the second object by means of replacing the first object with the second object when a state changes from the first state to the second state, wherein the second object includes a mini application associated with the first object, and an empty area or an image obtained by capturing the last execution screen of an application is provided in a corresponding area in the third UI when a second object corresponding to the first object does not exist.

Based on an electronic device and an operation method thereof according to the various embodiments, a UI (e.g., a home screen) based on the first object (e.g., an application icon) or a UI (e.g., a home screen) based on the first object and the second object (e.g., a widget) may be provided in response to a change in the form of the display (e.g., a change between a folded form and an unfolded form). According to various embodiments, when a state of the display changes from a folded state to an unfolded state, the first object and the second object may be provided together in the unfolded state by increasing a space between first objects and displaying a second object associated with the first object in the increased space (e.g., an empty area) between the first objects.

According to various embodiments, a UI based on the first object and the second object may be provided through the display when the display is unfolded, and a UI based on the first object is provided through one screen of the display and a UI based on the second object may be provided through the other screen of the display when the display is folded.

According to various embodiments, a widget may be automatically provided by merely through an operation of changing the form of the display, without a cumbersome procedure whereby a user adds the widget to the home screen through a separate setting procedure. According to various embodiments, a widget associated with an icon on a basic home screen set by a user may be provided. Thus, the user may be able to switch between an application icon and a widget or change the size thereof without going through a separate setting process. According to various embodiments, the electronic device may switch and provide, in real time, the home screen based on icons or the home screen based on icons and widgets by refreshing the home screen, in response to a change in the form of the display (e.g., from a folded form to an unfolded form, or from an unfolded form to a folded form). The electronic device according to various embodiments may contribute to improving the usability, convenience, and competitiveness of the electronic device.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include read-only memory (ROM), random-access memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display; and
   at least one processor operatively coupled to the display and configured to:
   identify an operation state of the display,
   control the display to display a first UI based on a first object in response to the identifying that the operation state is a first state, and
   control the display to display a second UI based on the first object and a second object associated with the first object, at a portion adjacent to the first object, in response to the identifying that the operation state is a second state.

2. The electronic device of claim 1, wherein the first object includes an application icon, and the second object includes a mini application associated with the first object.

3. The electronic device of claim 1, wherein the display comprises at least two areas, and the at least one processor is further configured to identify the operation state of the display based on operation states of the at least two areas of the display.

4. The electronic device of claim 3, wherein the at least one processor is further configured to:
   detect a state change from the first state to the second state in response to the operation states of the at least two areas of the display, and
   increase a size of an empty space between the first object and another object, and display the second object in the empty space, based on the detecting of the state change.

5. The electronic device of claim 4, wherein the at least one processor is further configured to, based on the detecting of the state change from the first state to the second state, display a switching effect using a widget shadow through the empty space between the first object and the other object, corresponding to a direction in which the state change proceeds.

6. The electronic device of claim 3, wherein the at least one processor is further configured to:
   detect a state change from the second state to the first state in response to the operation states of the at least two areas of the display, and
   decrease a size of an empty area between the first object and another object and discontinue the display of the second object, based on the detecting of the state change.

7. The electronic device of claim 6, wherein the at least one processor is further configured to, based on the detecting of the state change from the second state to the first state, allocate the first object to a first area of the at least two areas of the display and allocate the second object to a second area of the at least two areas of the display.

8. The electronic device of claim 3,
   wherein the at least one processor is further configured to control the display to display the first object on a first area of the at least two areas of the display, and display the second object on a second area of the at least two areas of the display in response to the identifying that the operation state is the first state.

9. The electronic device of claim 8, wherein the at least one processor is further configured to detect a flipping of the electronic device and deactivate one of the first area and the second area, based on the detecting of the flipping.

10. The electronic device of claim 1, wherein the at least one processor is further configured to identify the second object associated with the first object, and provide, as the second object, an empty space or an image obtained by a capturing of a last execution screen of an application corresponding to the first object based on the identifying of the second object.

11. The electronic device of claim 3, wherein the at least one processor is further configured to:
identify the second object from objects displayed on one of the at least two areas of the display where the first object is not displayed, and
provide, as the second object, the identified object from the objects displayed on the one of the at least two areas of the display, an empty space corresponding to the second object, or an image obtained by capturing a last execution screen of an application corresponding to the first object based on identifying the second object.

12. An operation method of an electronic device, the operation method comprising:
identifying an operation state of a display;
displaying a first user interface (UI) based on a first object, in response to the identifying that the operation state is a first state; and
displaying a second UI based on the first object and a second object associated with the first object, at a portion adjacent to the first object in response to the identifying that the operation state is a second state.

13. The operation method of claim 12,
wherein the first object includes an application icon, and
wherein the second object includes a mini application associated with the first object.

14. The operation method of claim 12, wherein the identifying of the operation state comprises identifying the operation state of the display based on operation states of at least two areas of the display.

15. The operation method of claim 14, further comprising:
detecting a state change from the first state to the second state in response to the operation states of the at least two areas of the display; and
increasing a size of an empty space between the first object and another object and displaying the second object in the empty space, based on the detecting of the state change,
wherein the displaying of the second object comprises, based on the detecting of the state change from the first state to the second state, displaying a switching effect using a widget shadow through the empty space between the first and the other object, corresponding to a direction in which the state change proceeds.

16. The operation method of claim 14, further comprising:
detecting a state change from the second state to the first state in response to the state changes of the at least two areas of the display; and
decreasing a size of an empty space between the first object and another object and discontinuing the display of the second object based on the detecting of the state change,
wherein the displaying of the first UI comprises:
allocating the first object to a first area of the at least two areas of the display, and
allocating the second object to a second area of the at least two areas of the display.

17. The operation method of claim 14, wherein the displaying of the first UI comprises:
displaying the first object on a first area of the at least two areas of the display and displaying the second object on a second area of the at least two areas of the display in response to the identifying that the operation state is the first state.

18. The operation method of claim 17, wherein the displaying of the first UI comprises detecting a flipping of the electronic device and deactivating one of the first area and the second area based on the detecting of the flipping.

19. The operation method of claim 12, wherein the displaying of the second UI comprises identifying the second object associated with the first object, and
providing, as the second object, an empty space or an image obtained by a capturing a last execution screen of an application corresponding to the first object based on the identifying of the second object.

20. The operation method of claim 14, wherein the displaying of the second UI comprises:
identifying the second object from objects displayed on one of the at least two areas of the display where the first object is not displayed; and
providing, as the second object, the identified object from the objects displayed on the one of the at least two areas of the display, an empty space corresponding to the second object, or an image obtained by capturing a last execution screen of an application corresponding to the first object based on identifying the second object.

\* \* \* \* \*